United States Patent
Chatterjee et al.

(10) Patent No.: US 10,904,948 B2
(45) Date of Patent: Jan. 26, 2021

(54) APPARATUS, SYSTEM AND METHOD TO IMPLEMENT RESERVED RESOURCES FOR FORWARD COMPATIBILITY IN NEW RADIO (NR) NETWORKS

(71) Applicant: Intel IP Corporation, Santa Clara, CA (US)

(72) Inventors: Debdeep Chatterjee, San Jose, CA (US); Dae Won Lee, Portland, OR (US); Ajit Nimbalker, Fremont, CA (US); Gang Xiong, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 33 days.

(21) Appl. No.: 16/465,486

(22) PCT Filed: Aug. 2, 2018

(86) PCT No.: PCT/US2018/045048
§ 371 (c)(1),
(2) Date: May 30, 2019

(87) PCT Pub. No.: WO2019/028276
PCT Pub. Date: Feb. 7, 2019

(65) Prior Publication Data
US 2019/0342944 A1 Nov. 7, 2019

Related U.S. Application Data

(60) Provisional application No. 62/588,207, filed on Nov. 17, 2017, provisional application No. 62/557,001, (Continued)

(51) Int. Cl.
*H04W 88/06* (2009.01)
*H04W 76/27* (2018.01)
(Continued)

(52) U.S. Cl.
CPC ......... *H04W 88/06* (2013.01); *H04W 72/042* (2013.01); *H04W 72/044* (2013.01);
(Continued)

(58) Field of Classification Search
None
See application file for complete search history.

(56) References Cited

U.S. PATENT DOCUMENTS 10,772,146 B2 * 9/2020 Shi .................. H04W 80/02
2018/0145818 A1 * 5/2018 Choi .................. H04L 5/0051
(Continued)

OTHER PUBLICATIONS

PCT International Preliminary Report on Patentability in PCT International Application Serial No. PCT/US2018/045048 dated Feb. 4, 2020 (11 pages).
(Continued)

*Primary Examiner* — Otis L Thompson, Jr.
(74) *Attorney, Agent, or Firm* — Alliance IP, LLC

(57) ABSTRACT

An apparatus of a New Radio (NR) User Equipment (UE), a method and system. The apparatus includes a radio frequency (RF) interface and one or more processors coupled to the RF interface and configured to: decode a communication from a NR evolved Node B (gNodeB), the communication including information on configuration parameters of reserved physical resources confined within a bandwidth part (BWP) of a wireless channel, the configuration parameters including time and frequency resources; based on the communication, determine the reserved physical resources as being allocated reserved physical resources; and process signals received on, or for communication on, only physical resources not overlapping the allocated reserved physical resources.

25 Claims, 10 Drawing Sheets

Table 1. Priority order for different reserved resources

| Priority order | Reserved resource |
|---|---|
| 00 | A first reserved resource with a first priority order configured by higher layers |
| 01 | A second reserved resource with a second priority order configured by higher layers |
| 10 | A third reserved resource with a third priority order configured by higher layers |
| 11 | A fourth reserved resource with a fourth priority order configured by higher layers |

Related U.S. Application Data filed on Sep. 11, 2017, provisional application No. 62/540,421, filed on Aug. 2, 2017.

(51) Int. Cl.
  *H04W 72/04* (2009.01)
  *H04W 80/08* (2009.01)
  *H04W 92/10* (2009.01)

(52) U.S. Cl.
  CPC ........... *H04W 76/27* (2018.02); *H04W 80/08* (2013.01); *H04W 92/10* (2013.01)

(56) References Cited

U.S. PATENT DOCUMENTS

| | | | |
|---|---|---|---|
| 2018/0220288 A1* | 8/2018 | Agiwal | H04W 48/12 |
| 2019/0116592 A1* | 4/2019 | Moon | H04L 5/0092 |
| 2019/0239123 A1* | 8/2019 | Kim | H04W 72/0453 |
| 2019/0281641 A1* | 9/2019 | Cheng | H04W 92/20 |
| 2020/0021998 A1* | 1/2020 | Baldemair | H04W 16/14 |
| 2020/0037343 A1* | 1/2020 | He | H04W 72/1263 |
| 2020/0137793 A1* | 4/2020 | Chen | H04W 72/042 |
| 2020/0163048 A1* | 5/2020 | Kim | H04W 4/90 |
| 2020/0245231 A1* | 7/2020 | Wei | H04W 48/14 |
| 2020/0280524 A1* | 9/2020 | Guo | H04L 5/0048 |
| 2020/0280945 A1* | 9/2020 | Tiirola | H04B 7/0617 |
| 2020/0280999 A1* | 9/2020 | Guo | H04W 72/082 |

OTHER PUBLICATIONS

Ericsson, "On Bandwidth Parts," R1-1709054, 3GPP TSG RAN WG1 Meeting # 89, Hangzhou, China, May 7, 2017. (3 pages).
Ericsson, "On UL SPS Transmission," R1-1709098, 3GPP TSG RAN WG1 Meeting #89, Hangzhou, China, May 7, 2017. (5 pages).
Huawei et al, "On Bandwidth Part and Bandwidth Adaptation," R1-1706900 3GPP TSG RAN WG1 Meeting # 89, Hangzhou, China May 6, 2017. (10 pages).
Intel Corporation, "Group-Common PDCCH: Contents," R1-1707385, 3GPP TSG RAN WG1 Meeting #89, Hangzhou, China, May 7, 2017. (5 pages).
PCT International Search Report and Written Opinion in PCT International Application Serial No. PCT/US2018/045048 dated Nov. 28, 2018 (13 pages).
Wilus Inc., "UE Procedure for Group Common PDCCH for NR," R1-1708975, 3GPP TSG RAN WG1 Meeting #89, Hanszhou, China, May 7, 2017. (6 pages).

* cited by examiner

300

Table 1. Priority order for different reserved resources

| Priority order | Reserved resource |
|---|---|
| 00 | A first reserved resource with a first priority order configured by higher layers |
| 01 | A second reserved resource with a second priority order configured by higher layers |
| 10 | A third reserved resource with a third priority order configured by higher layers |
| 11 | A fourth reserved resource with a fourth priority order configured by higher layers |

FIG. 3

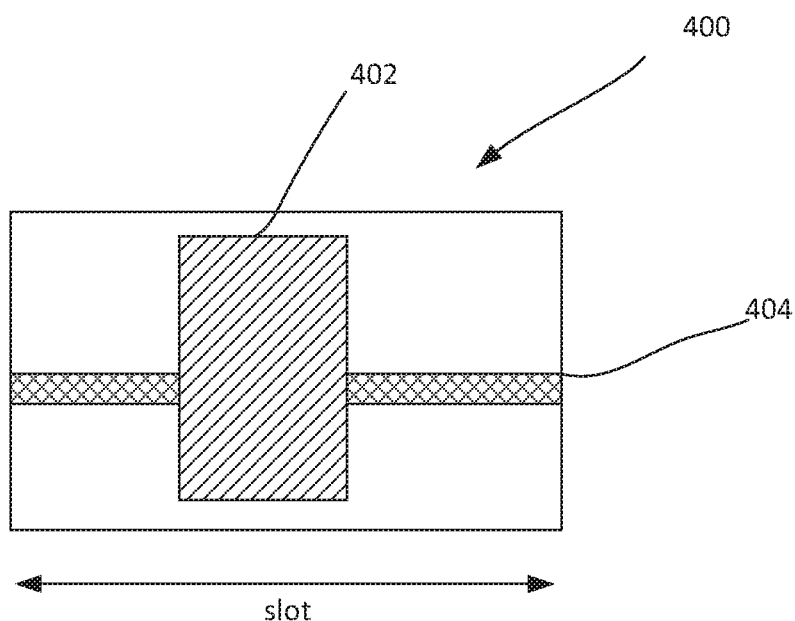

FIG. 4

APPARATUS, SYSTEM AND METHOD TO IMPLEMENT RESERVED RESOURCES FOR FORWARD COMPATIBILITY IN NEW RADIO (NR) NETWORKS

CROSS REFERENCE TO RELATED APPLICATION

This Application is a national stage application under 35 U.S.C. § 371 of PCT International Application Serial No. PCT/US2018/045048, filed on Aug. 2, 2018 and entitled "APPARATUS, SYSTEM AND METHOD TO IMPLEMENT RESERVED RESOURCES FOR FORWARD COMPATIBILITY IN NEW RADIO (NR) NETWORKS," which application claims the benefit of and priority from U.S. Provisional Patent Application No. 62/540,421 entitled "ON THE RESERVED PHYSICAL RESOURCE FOR FORWARD COMPATIBILITY IN NR," filed Aug. 2, 2017, and from U.S. Provisional Patent Application No. 62/557,001 entitled "ON THE RESERVED PHYSICAL RESOURCE FOR FORWARD COMPATIBILITY IN NR," filed Sep. 11, 2017, and from U.S. Provisional Patent Application No. 62/588,207 entitled "RESERVED PHYSICAL RESOURCE FOR FORWARD COMPATIBILITY IN NEW RADIO (NR)," filed Nov. 17, 2017. The disclosures of the prior applications are considered part of and are hereby incorporated by reference in their entirety in the disclosure of this application.

TECHNICAL FIELD

This disclosure generally relates to achieving forward compatibility of New Radio (NR) networks with future services and applications.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RAT) to enrich people lives with better, simple and seamless wireless connectivity solutions. NR will enable everything connected by wireless and deliver fast, rich contents and services.

As agreed in RAN1, NR should strive to achieve the forward compatibility of different features. In particular, NR is aiming to maximize the amount of time and frequency resources that can be flexibly utilized or that can be designated as flexible without causing backward compatibility issues in the future. Improvements are needed in the design of NR to make the above goals possible.

BRIEF DESCRIPTION OF THE DRAWINGS

FIG. 3 depicts a Table illustrates one example of priority orders for four types of reserved physical resources;

FIG. 4 depicts a signaling diagram where two reserved physical resources are configured with differing priorities;

DETAILED DESCRIPTION

Figure 1:
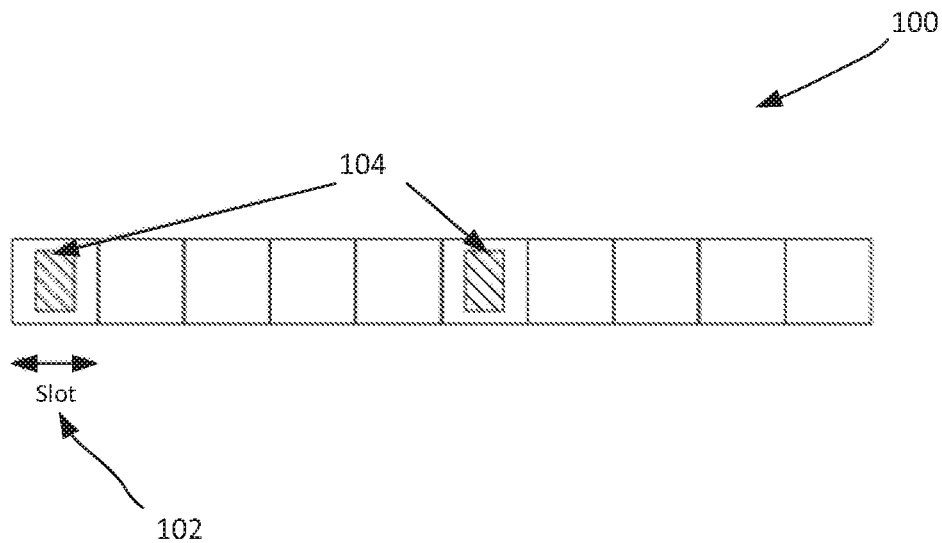
FIG. 1 depicts a signaling diagram showing reserved physical resources for future services or applications.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third-generation partnership project (3GPP) long term evolution (LTE) and New Radio (NR), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi.

In 3GPP radio access network (RAN) Long Term Evolution (LTE) and NR systems, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission may be a communication from the node (e.g., eNodeB) to the wireless device (e.g., UE), and the uplink (UL) transmission may be a communication from the wireless device to the node.

In LTE and NR, data may be transmitted from the base station to the UE via a physical downlink shared channel (PDSCH), and from the UE to the base station via a physical uplink shared channel (PUSCH). A physical downlink control channel (PDCCH) may be used to provide control information regarding a downlink PDSCH. A physical uplink control channel (PUCCH) may be used to acknowledge that data was received. Downlink and uplink channels or transmissions may use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. Frequency Division Multiplexing (FDM) is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission may operate using different frequency carriers (i.e. separate carrier frequency for each transmission direction). In FDD, interference may be avoided because the downlink signals use a different frequency carrier from the uplink signals.

Referring now to FIG. 1, a portion of a signal 100 is shown including 10 slots where one in every five slots is shown as including reserved physical (time and frequency) resources to enable forward compatibility and to allow future evolution beyond NR. The reserved physical resources may be reserved for future services and applications, such as, for example, being allocated for sidelink or vehicular to vehicular (V2V) communication or massive Machine-Type Communication (mMTC). By "allocated reserved physical resources," what is meant in the instant description is a reference to physical resources that are reserved for the purpose of being allocated for future services or applications.

The following items have already been agreed upon within the NR group with regard to reserved physical resources: (1) that explicit signaling to NR UEs may be used to indicate reserved physical resources; (2) that the details on signaling information and transmission are for further study (FFS) including: a granularity for blank resource indication, RRC signaling and/or LI signaling (including DL control information), broadcast and/or unicast signaling, whether this signaling is applicable to UE UL operation and/or DL operation and/or sidelink operation, a combination of the above signaling, and time and frequency granularity.

In general, reserved physical resources are be configured by higher layers in a semi-static manner. However, in cases where there is no data traffic on the reserved physical resources, the reserved physical resources may be released to reduce the overhead and thereby improve system level spectrum efficiency. To enable this feature, mechanisms on dynamic activation and deactivation of the reserved physical resources are defined herein.

Embodiments herein relate to detailed design for reserved physical resources in NR. In particular, embodiments may include one or more of: (1) a configuration of reserved physical resources; (2) a dynamic activation and deactivation of reserved physical resources; (3) a priority ordering for reserved physical resources; and (4) UE behavior on the reserved physical resources.

Configuration of Reserved Physical Resources

In NR, the reserved physical resource may be semi-statically configured by the New Radio evolved Node B (gNodeB) through higher layers, for example via NR minimum system information (MSI), NR remaining minimum system information (RMSI), NR system information block (SIB) or radio resource control (RRC) signaling, or dynamically indicated via downlink control information (DCI), or indicated via a combination thereof. The configuration parameters of the reserved physical resources may include, for example, time resource information, frequency resource information, numerology information, and priority order information.

By way of example, in the time domain, a slot offset and periodicity of reserved physical resources can be configured, where in the configured slots, symbol index or the start and/or end symbol and/or duration of reserved physical resource can be configured. For example, slots or pairs of slots may be indicated by way of symbol identifiers in a bitmap, where each bit denotes where a symbol or slot may be reserved. Note that the slot and symbol index can be determined in accordance with a reference numerology, which may be the numerology used for the transmission of synchronization block (SS block), or predefined in the specification (e.g., 15 KHz for below 6 GHz carrier frequency and 120 KHz for above 6 GHz carrier frequency), or the numerology which is configured for a bandwidth part (BWP) in case when reserved physical resource is confined within the bandwidth part.

In NR, the reserved physical resource may be semi-statically configured by the New Radio evolved Node B (gNodeB) via higher layers, for example via NR minimum system information (MSI), NR remaining minimum system information (RMSI), NR system information block (SIB) or radio resource control (RRC) signaling, or dynamically indicated by the gNodeB via downlink control information (DCI), or via a combination of semi-static and dynamic indications as noted above. The configuration parameters of the reserved physical resources may for example include at least one of time resource, frequency resource, numerology, or priority order.

In the time domain, according to some embodiments, the configuration parameters may include a periodicity of reserved physical resources. They may also include, for a configured slot, a slot index, a symbol index, and/or the start and/or end symbol and/or duration of reserved physical resources. The configuration parameters of the reserved physical resources, such as slot and symbol index, may be defined in accordance with a reference numerology, which may be the numerology used for the transmission of synchronization block (SS block), or predefined in the specification (e.g., 15 KHz for below 6 GHz carrier frequency and 120 KHz for above 6 GHz carrier frequency), or the numerology configured for a bandwidth part (BWP) for one or more reserved physical resources confined within the BWP.

In the frequency domain, according to some embodiments, the configuration parameter may include a DL or UL frequency resource allocation type. In one example, the configuration parameters may include the starting resource block (RB) and length of reserved physical resources in numbers of RBs or groups of RBs that are contiguous-in-frequency. In another example, the configuration parameter may include frequency allocation type based on resource block group (RBG) corresponding to reserved physical resources that may or may not be contiguous-in-frequency. The RBG size may for example be predefined in the specification, for example based on a bandwidth of the BWP within which the RPRs are confined, or based on carrier bandwidth. The RBG may for example comprise one or more consecutive physical resource blocks (PRBs) in a frequency domain. According to another embodiment, the RBG size may be configured by higher layer signaling, such as MSI, RMSI, SIB or RRC signaling. As a further signaling overhead reduction, some embodiments contemplate allocating a full bandwidth of a carrier, or a full bandwidth of a BWP for reserved physical resources. In the latter cases, only symbol or slot index would be needed for reserved physical resource configuration.

By way of example, a RBG may, according to one embodiment, be limited to a single PRB. The gNodeB may use a bitmap of 275 bits, with each bit in the bitmap designating a RBG or PRB that may be part of a reserved physical resource.

According to some embodiments, resource element (RE)-level granularity for RRC configured reserved physical resources may be implemented in an effort toward minimizing the impact from resource reservation on system spectral efficiency. One such example use case is for a reservation of REs corresponding to LTE cell-specific reference signal (CRS). It can be expected that such RE-level resource reservations in general can be configured according to embodiments within a physical resource block (PRB) in frequency, and in slot duration in the time domain.

Considering the above resource reservation granularities possible depending on use cases, a single resource configuration framework that can scale from resource reservation at RE-level to reservation of the entire BWP or CC (for certain symbols or slots) or reservation of certain PRBs or subcarriers for all time-slots may be defined according to some embodiments.

Accordingly, in an embodiment, a reserved physical resource set may be configured as a combination of one or more of the following steps, using UE-specific or cell-specific RRC signaling: (1) reserved physical resource configuration in time at the slot-level, which may for example be achieved as described above in terms of slots or groups of slots, e.g., using a time-domain periodicity and offset; (2) reserved physical resource configuration in frequency at the PRB-level, which may be achieved as described above, for example by identifying the PRBs intended for resource reservation for contiguous or non-contiguous sets of PRBs (e.g., via starting PRB and number of PRBs, or starting and ending PRBs, or non-contiguous sets of PRBs using RBG-level identification); (3) for the identified time (slot-level) and frequency (PRB-level) resources, a default behavior may be defined such that the UE is expected to consider the entire PRB by slot as being reserved; (4) in addition to or as alternative to item (3) immediately above, the gNodeB may also be configured to identify the set of REs within a resource and within a PRB by slot region that the UE should assume is reserved. According to one example, the above could correspond only to the REs corresponding to the LTE PDCCH and/or LTE CRS locations for a certain number of LTE CRS ports (e.g. two or four). Identification of the set of REs within a resource (i.e. at RE-level) may for example be realized according to some embodiments using: (a) a 2-dimensional bitmap covering the PRB by slot region; (b) two 1-dimensional bitmaps of lengths 12 (subcarriers) and 14 (symbols) respectively; (c) an indication of specific (predefined) RE patterns within the PRB by slot region; or (d) an indication of a set of contiguous or non-contiguous symbols and set of contiguous or non-contiguous subcarriers within the PRB by slot region. If, for a particular reserved physical resource configuration, the gNodeB configures reserved physical resources using option (4) above, the UE considers only the identified REs as reserved for all the slots or all the PRBs using steps 1 and 2, respectively.

In general, it is possible that the configuration parameters for the reserved physical resources are signaled using a reference numerology (e.g. one that is pre-defined, such as 15 kHz, or a numerology of the SS blocks) where the configured numerology for the UE in the impacted slot and PRB may be different from the reference numerology. The above can lead to misalignment between the indicated reserved physical resources and the resource grid for the slot and PRB in the active BWP for the UE. For instance, a reserved RE at 15 kHz subcarrier spacing would cover 4 symbols but only $\frac{1}{4}^{th}$ of the span in frequency if the subcarrier spacing is 60 kHz in a slot of the active BWP for the UE. Similar considerations may also lead to reservation of partial PRBs or slots.

To handle such cases, in an embodiment, at least for the case of RE-level resource reservation, the UE shall assume that the set of REs according to the numerology of the active BWP that completely covers the indicated reserved physical resources are reserved. For the case of PRB-level resource reservation, this could be extended to the set of PRBs in current numerology that cover the identified reserved PRBs.

Further, in another embodiment, if reserved physical resources overlap with a part of a PDCCH CORESET such that the reserved physical resources are not perfectly aligned with the REG bundling size configured for the CORESET, the UE can assume the resources corresponding to the entire affected REG bundle as being reserved.

"Overlapping" refers to a partial overlapping or a full overlapping.

In the case of carrier aggregation, the configuration parameters for reserved physical resources including physical resource allocation, numerology, priority order, etc. may according to one embodiment be extended for one or more component carriers (CC) or BWPs. In particular, the configuration of the reserved physical resources for multiple component carriers (CC) may be indicated in the primary cell (PCell). The number of CCs in the configuration may be predefined or configured by the higher layers. For each UE, the CC index(es) used for the configurations of the reserved physical resources may be configured in a UE specific manner via dedicated RRC signaling. Alternatively, the reserved physical resources for a CC may be signaled to the UEs by the gNodeB as part of the UE-specific RRC signaling used to configure the CC for the UE.

For an indication of reserved physical resources for multiple BWPs, in one embodiment, a common PRB indexing based on a reference numerology (e.g., 15 kHz) may be used instead of a UE-specific PRB indexing.

Figure 2:
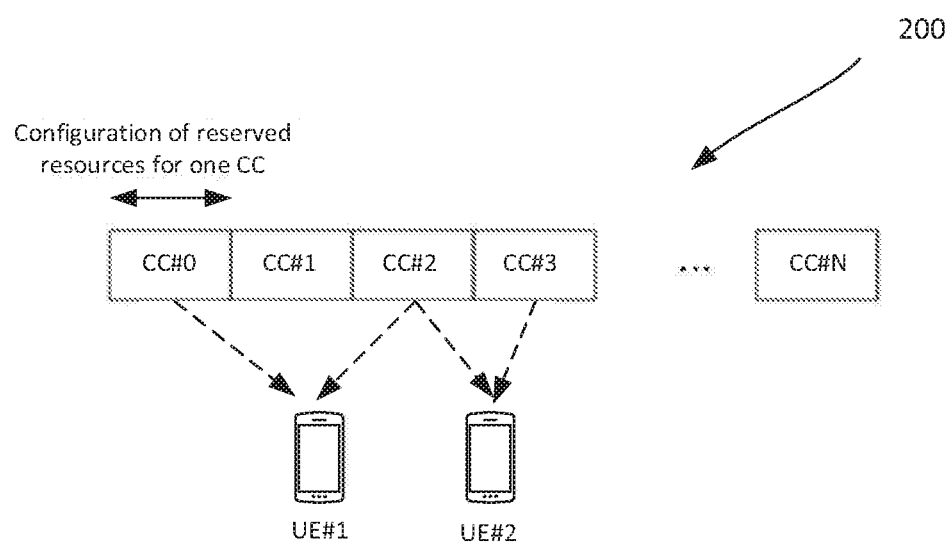
FIG. 2 depicts a signaling diagram showing reserved physical resources for future services and applications in a carrier aggregation (CA) scenario.

Referring now to FIG. 2, a signaling diagram is shown for a signal 200 from a gNodeB to two UEs, UE #1 and UE #2. In signal 200, the reserved physical resources are shown in a carrier aggregation (CA) scenario. In the shown scenario of FIG. 2, the reserved physical resources for N CCs are included. As shown in the figure, UE #1 obtains the configuration information for CC #0 and #2 while UE #2 obtains the configuration information for CC #2 and #3 for the reserved physical resources.

Dynamic Activation and Deactivation of Reserved Physical Resources

In general, reserved physical resources are be configured by higher layers in a semi-static manner. However, in cases where there is no data traffic on the reserved physical resources, the reserved physical resources may be released to reduce the overhead and thereby improve system level spectrum efficiency. To enable this feature, mechanisms on dynamic activation and deactivation of the reserved physical resources are defined herein.

According to some embodiments, a hybrid mode of semi-static configuration and dynamic activation/deactivation may be used for reserved physical resources. In particular, a semi-static configuration of reserved physical resources can be configured by the gNodeB via higher layer signaling, while dynamic signaling via Layer 1 (L1) (e.g. DCI) or higher layer control signaling may be used to dynamically activate or deactivate allocated reserved physical resources.

According to one embodiment, the periodically occurring reserved resources may for example be configured or activated on an as needed basis. In another embodiment, DCI-based signaling may be used by the UE to only deactivate/release, one or more instances of one or more reserved physical resources. In particular, according to some embodiments, periodically occurring reserved physical resources may be deactivated/released by the gNodeB to reduce the overhead and thereby improve system level spectrum efficiency. The deactivation/release may for example be advantageous when one or more instances of a reserved physical resource may not be anticipated by the gNodeB for use by other services or applications (such as being allocated for sidelink, V2V or mMTC). In this case, a deactivation/release of such a resource may allow the resource to be used for communication between the gNodeB and the UE as a matter of course.

According to one embodiment, DCI may be used to activate and/or deactivate one or more reserved physical resources. As one option, this DCI may be UE specific, and one bit field in the DCI carrying a DL or UL grant may be used to activate and/or deactivate one or more reserved physical resources. For instance, bit "1" may indicate that a reserved physical resource is activated while bit "0" indicates that the reserved physical resource is deactivated. In another option, the activating/deactivating DCI may be cell specific or group specific, where one bit may be used to activate or deactivate one reserved physical resource (in the event where multiple reserved physical resources are configured) for one CC. Further, a new Radio Network Temporary Identifier (RNTI), e.g., radio resource (RR) RNTI or RR-RNTI, may be defined for the transmission of NR physical downlink control channel (PDCCH), wherein the cyclic redundancy check (CRC) may be scrambled by RR-RNTI. This RR-RNTI may, according to some embodiments, be predefined in the NR specification, or configured by higher layers via MSI, RMSI, SIB or RRC signaling. Further, the periodicity of the NR PDCCH which contains the activation and deactivation information of a reserved physical resource may be configured by higher layers via MSI, RMSI, SIB or RRC signaling.

A "reserved physical resource" corresponds to a particular time-frequency and periodicity configuration of such resources. Thus, according to one embodiment, a released resource may not be activated (i.e., reserved) based on only Layer 1 signaling, as it would be configured semi-statically as periodically occurring by the gNodeB through higher layer signaling. The above provides additional robustness by avoiding potential impact from missed DCIs if only DCIs were used to activate reserved physical resources.

According to some embodiments, there could be multiple configurations of reserved physical resources signaled in a cell or, as described before, reserved physical resources may be configured by the gNodeB as periodically occurring. For the first case, a certain indexing of the sets of reserved physical resources may be defined and the dynamic release/reservation indication can include the index (or indices) of reserved physical resources that are to be dynamically released or reserved. The indexing in such a case can be UE-specific or non-UE-specific depending on the use of UE-specific or group-common signaling used for the reserved physical resources configuration and the signaling used for dynamic release and/or reservation (i.e., UE-specific DCI or group-common DCI). By way of example, a first reserved resource configuration could designate symbol 0 of one or more slots as being reserved for a first type of communication, and a second reserved resource configuration could designate symbol 1 of one or more slots as being reserved for a second type of communication. Indexing would allow an identification of groups of physical resources corresponding to each of the first and second reserved resources configurations, which would facilitate, for example, deactivation through DCI.

For the second case of periodically occurring reserved physical resources, the dynamic release/reservation indication can be applied to one or more specific instances of the periodically occurring reserved physical resources as suggested previously. Towards the above goal, for periodically occurring reserved physical resources, certain instances of such reserved physical resources may be released via either UE-specific or group-common DCI carried by PDCCH. Such a PDCCH may be monitored in the time-frequency resources defined with respect to the instances of the reserved physical resources themselves that were released. As an example, the UE may be configured to interpret a certain instance of reserved physical resources as being released upon successful detection of the DCI carrying the release indication in a PDCCH monitoring occasion that bears a relationship to the particular instance of the reserved physical resources (e.g., the latest monitoring occasion before the start of the particular instance of reserved physical resources).

In another embodiment, a new Logical Channel ID (LCID) in a Medium Access Control (MAC) header may be defined for the purpose of activation and deactivation of a reserved physical resource. Further, a corresponding MAC control element (CE) may be defined. In one option, the MAC CE may be zero bit long, in which case a presence of the MAC CE may be used to indicate activation or deactivation of reserved physical resources. For example, the reserved physical resources may be toggled for each occurrence of the MAC CE. Alternatively, two MAC CEs may be defined—one for activation and other for deactivation of the reserved physical resources. In another option, the MAC CE may include further information about the activation and deactivation of reserved physical resource, for example an identification or index of reserved physical resources to be activated/deactivated in the event that multiple reserved physical resources are configured.

In another embodiment, RRC signaling, such as RMSI, SIB, or UE specific RRC signaling may be used to activate or deactivate the reserved physical resources. As one or more sets of reserved physical resources may be defined which may be identified by their corresponding identifier or indices, RRC signaling may be used to activate or deactivate certain reserved physical resources/set of resources using an identifier or index in the RRC message. In one option, the RRC message may include a dedicated message to a certain UE, such as a RRC Connection Reconfiguration message. Optionally, the UE may acknowledge or confirm the successful reception of such a message. In another option, a broadcast message such as a system information broadcast (SIB) may be used to activate or deactivate the reserved physical resources for a group of users. In general, this option may be more suitable when one or more reserved physical resource configurations are indicated in a cell-specific or at least a non-UE-specific manner while the activation/deactivation signaling targets a subset of UEs configured with the reserved physical resources.

Priority Ordering for Reserved Physical Resources

To ensure forward compatibility of different features, multiple reserved physical resources may be configured or indicated in a cell specific or UE group specific manner. For instance, a first reserved physical resource may be configured for sidelink while a second reserved physical resource may be configured for mMTC applications.

In the event that multiple reserved physical resources partially or fully overlap in the time domain and frequency domain, it may be desirable to define a priority order for different reserved physical resources. According to one embodiment of implementing a priority order, a reserved physical resource with the highest priority order may puncture on physical resources that overlap reserved physical resources with a lower priority order. In other words, the transmission in the reserved physical resources with lower priority order may be rate matched around the reserved physical resources with a higher priority order, or may be punctured on the physical resources overlapping the reserved physical resources with a higher priority order.

Referring now to FIG. 3, the figure at 300 illustrates one example of priority orders for four types of reserved physical resources. As mentioned above, priority order information may be configured or indicated together with time and frequency domain resource information for each reserved physical resource.

Referring next to FIG. 4, a signaling diagram 400 is shown, where a first reserved physical resource 402 is configured with a higher priority while a second reserved physical resource 404 is configured with a lower priority. If the first and second reserved physical resources partially or fully overlap, the first reserved physical resource 402 may, according to one embodiment, override the second reserved physical resource 404. For instance, the first reserved physical resource 402 may be allocated for ultra-reliable and low latency communications (URLLC) with periodic traffic while the second reserved physical resource may be allocated for mMTC. In this case, URLLC has higher priority than mMTC application and can, according to one embodiment, puncture the transmission for mMTC as shown in FIG. 3.

According to one embodiment, an actual transmitted synchronization signal (SS) block has higher priority than reserved physical resources. In one option, reserved physical resources are not to overlap with actual transmitted SS blocks. Accordingly, a UE may be configured to decode a SS block regardless of any reserved physical resources that may overlap with the SS block transmission, thus ignoring that the physical resources on which the SS block is transmitted are reserved. However, reserved physical resources may, according to one embodiment, partially or fully overlap with potentially transmitted SS blocks.

Where multiple reserved physical resources are allocated, one or more processors of the UE are to assume a union of the allocated first set of reserved physical resources and the allocated second set of reserved physical resources. This means in part that the UE is to treat different types of reserved physical resources essential as one type of reserved physical resources without assuming any priority of one type over another.

According to one embodiment, where multiple reserved physical resources are to be allocated to differing applications or services, where a first reserved physical resource for a first type of service or application overlaps, in time and frequency, a second reserved physical resources for a second type of service or application, and further where the first reserved physical resource is deactivated/released, the UE may be configured to treat the second reserved physical resource as a reserved physical resource regardless of any priority order of the first type of service or application and the second type of service or application. In other words, the UE may be configured to effectively assume a same priority order for all reserved physical resources and to treat them accordingly. Thus, where multiple reserved physical resources are configured through the gNodeB, the UE in current release may assume a union of the multiple reserved physical resources.

Alternatively, the reserved physical resources may be allowed to overlap with actually transmitted SS blocks. In such a case however, for communications including the data and control channels and other physical channels/signals transmitted within the reserved physical resources, such communications may be rate-matched around or punctured by the actually transmitted SS blocks.

In one embodiment, the UEs may be informed of the priority order of the signals and channels that it would need to receive and transmit on reserved physical resources. Based on the priority order of those signals and channels, the UE may assume that the signals and channels with lower priority would not be allocated resources that are configured with higher priority. For example, the gNodeB may configure three reserved physical resources with priority orders 1, 2, and 3 respectively. If the UE is expected to receive or transmit signals/channels on reserved physical resources that have priority 1, there would, according to this embodiment, be no rate-matching or puncturing at all for those resources. The priority 1 signal/channel would take priority over any other reservation signals. If the UE is expected to receive or transmit signals/channels on reserved physical resources that have priority 2, it may ignore reservation signals reserved for priority 3 channels, but rate-match around reservation signals for priority 1 signal/channels. The above would preserve signal quality for higher priority communications.

UE Behavior on Reserved Physical Resources

It may be possible that the UE may receive conflicting signaling with respect to physical resources that are to be reserved. For example, when reserved physical resources are configured by higher layers in a semi-static manner as described previously, it may be possible that the UE may receive conflicting information regarding the reserved physical resources for example through other signaling. In this regards, the UE behavior would benefit from being defined to avoid misalignment between the gNodeB and the UE to ensure proper operation.

In one embodiment, depending on the type of communication to be effected, e.g., for low latency applications or URLLC, the gNodeB may in some instances schedule data transmission on reserved physical resources not allocated for the data transmission, whose reserved status may have been previously indicated to the UE via semi-static higher layer signaling, such as through RRC signaling. Thus, in the event that the gNodeB may indicate physical resources for DL or UL data transmission to the UE by way of DCI signaling a DL assignment or UL grant, and where the DL assignment or UL grant either partially or fully overlaps with the reserved physical resources not allocated for the DL assignment or UL grant, the UE may be configured to follow the UE specific DCI on the allocated resources and to therefore ignore the semi-static signaling indicating the reserved physical resources. In this case, the UE specific DCI may override the RRC signaling on the reserved physical resources.

In another embodiment, as agreed in the NR, slot format related information (SFI) may be carried by a group common (G-C) physical downlink control channel (PDCCH) (G-C PDCCH). The SFI may dynamically indicate to the UE at least which symbols are to be "DL", "UL" and "unknown"/"flexible", with "unknown" and "flexible" being used interchangeably herein. With respect to symbols indicated as flexible in the GC-PDCCH, the UE may be configured to avoid such symbols, that is, to not transmit on those symbols, and to not expect to receive anything on those symbols. The SFI may be configured to indicate an entire symbol in a time domain, thus spanning an entirety of the frequency domain for a given symbol. The SFI provides a dynamic signaling for one or more slots, and is different from RRC signaling which is semi-static rather than dynamic, and which is to indicate DL, UL or flexible statuses on a PRB level rather than on a slot or symbol level, and generally with periodicity. A function of the SFI in the G-C PDCCH would be to provide a dynamic adaption of symbols in TDD between UL, DL and flexible based on channel state, communication traffic, and thus to provide an opportunity for the UE to alter one or more instances of a periodically scheduled UL or DL communication.

In the even that symbols indicated by the SFI as flexible conflict with reserved physical resources which are configured as such by higher layers, the UE may, according to one embodiment follow the SFI indication. Alternatively, the UE may follow the RRC signaling on the reserved physical resources. In another option, whether to follow the SFI on the unknown symbols or RRC signaling on the reserved physical resources can be configured by higher layers via MSI, RMSI, SIB or RRC signaling.

In another embodiment, where the reserved physical resources may conflict with the channel state information—reference signal (CSI-RS) and/or sounding reference signal (SRS) and/or tracking reference signal (TRS), where those reference signals are defined, the gNodeB may not transmit the CSI-RS and/or SRS and/or TRS in the corresponding symbols where CSI-RS and/or SRS were originally scheduled in favor of preserving the reserved status of the reserved physical resources. In other words, the gNodeB may, according to some embodiments, avoid overlapping reference signals with reserved physical resources. Alternatively, CSI-RS and/or SRS and/or TRS may be punctured on the resource that overlaps with the reserved physical resources. In the above case, the UE may skip the measurement on CSI-RS and/or TRS or the transmission of SRS and/or TRS on the overlapped resource.

Figure 5:
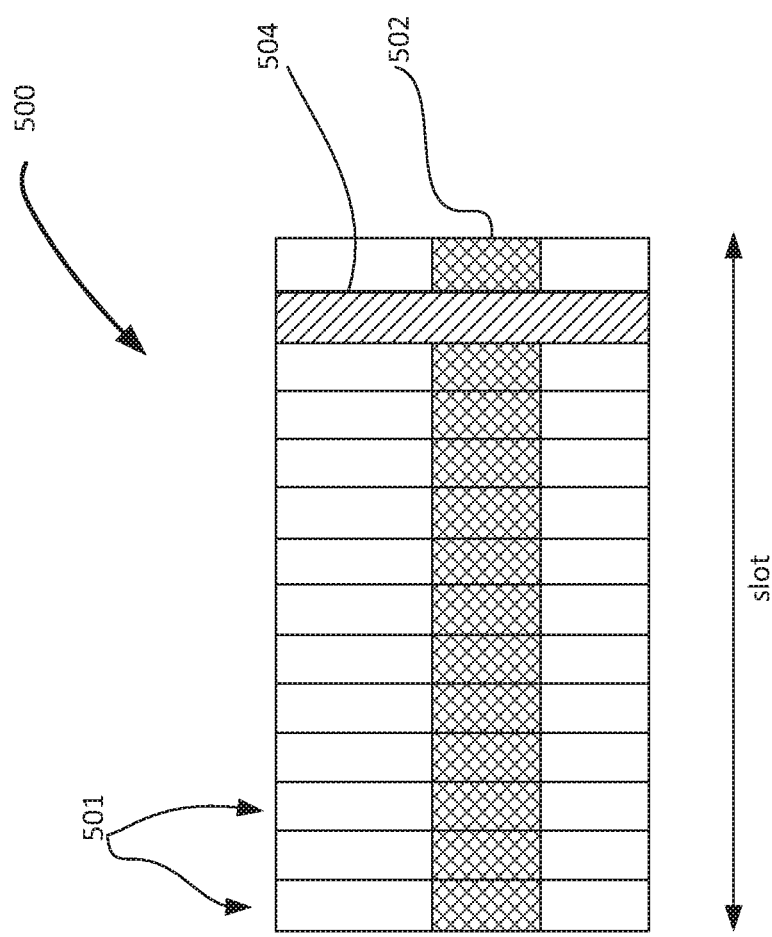
FIG. 5 depicts a signaling diagram showing an example of channel state information reference signal (CSI-RS) and reserved physical resources overlapping in the frequency domain.

FIG. 5 shows a signaling diagram 500 including a slot having 14 symbols 501. FIG. 5 illustrates one example of CSI-RS and reserved physical resources overlapping in the frequency domain. In the example, CSI-RS 502 is punctured on the overlapped resource with reserved physical resources 504. In this case, UE may skip the CSI measurement on the overlapped resource.

UE Behavior on Dynamically Reserved Physical Resources or Dynamically Changing DL/UL Direction Via SFI The gNodeB may, by way of semi-static signaling: (1) configure communication signals with UEs as UL or DL, where, if the relevant semi-static signaling is missing for a given PRB, the PRB is assumed by the UE as being flexible; (2) configure receive or transmit occasions for physical signals or channels, such as by way of SRS, schedule request (SR), periodic CSI reporting, UL configured grants or UL grant-free indications types 1 and 2, DL SPS, periodic CSI-RS configurations, and PDCCH monitoring The gNodeB may, by way of dynamic signaling, signal to the UE: (1) a SFI carried by PDCCH using DCI format 2_0; (2) a DCI-scheduled PDSCH/PUSCH, and corresponding PUCCH (w/HARQ-ACK feedback) for PDSCH.

Some of the above instances of semi-static and dynamic signaling will be referred to below in the context of UE behavior in the case of conflicts with reserve physical resource indications.

Dynamically Scheduled CSI Reporting Instances

As suggested above, in addition to resource reservation for forward compatibility that is primarily expected to be configured semi-statically via UE-specific or cell-specific RRC signaling, dynamic reservation of resources, as well as dynamic change of the DL/UL direction, at least at symbol-level, may be possible by use of the SFI carried by the group-common PDCCH (G-C PDCCH).

In such cases, when configured, the UE may, according to a configured monitoring periodicity, monitor G-C PDCCH carrying the SFI informing the UE of the current slots, and possibly a certain number of subsequent slots, in terms of which symbols are DL, UL, or flexible (sometimes also referred to as "unknown" or "reserved"). There can be cases where the UE may observe a conflict between the indication in the SFI on the one hand, and a scheduling DCI on the other hand. Such conflicts may occur for the entire duration of the scheduled data channel (PDSCH/PUSCH duration) or on some of the symbols within the data duration.

In some embodiments, the UE is expected to follow the indication in the DCI and disregard any conflicting indication in the SFI. Essentially, once it receives the DCI for PDSCH, or for PUSCH, the UE may not expect any conflicting information with respect to DL or UL allocations. However, there can be situations when the UE is expected to prioritize the indication in the SFI over the DCI. For instance, if the DCI scheduled PDSCH/PUSCH is in a later slot, and subsequently the gNodeB transmits an SFI in the later slot indicating some or all of the assigned symbols (i.e. the symbols of the DCI schedule PDSCH/PUSCH) as flexible to prioritize for some other purpose (e.g., URLLC transmissions, etc.), the UE may prioritize the indication in the subsequent SFI over the indication in the DCI.

To handle such cases, according to one embodiment, for PDSCH, the UE may assume that the entire PDSCH is dropped, and for PUSCH, the UE may drop the entire PUSCH transmission. For example, the above may happen in one embodiment where information in an DL SPS or UL grant-free transmission type 1 or type 2 may conflict with the information in the DCI regarding PDSCH or regarding PUSCH.

In another embodiment, for multi-slot or multi-mini-slot transmissions scheduled in a DCI for PDSCH or PUSCH, the UE may drop only the reception of the PUSCH or transmission of the PDSCH in slots or mini-slots that present a conflict with other signaling, such as SFI signaling. In this manner, the UE may assume either puncturing (i.e., the RE mapping is assumed although actual symbols are not transmitted) or rate-matching, instead of the entire reception/ transmission.

In another embodiment, where the DCI is for PDSCH, the UE may assume that the PDSCH symbols in the affected Orthogonal Frequency Division Multiplexing (OFDM) symbols (in OFDM symbols that present a conflict with respect to other signaling, such as SFI signaling) are punctured from the transmitter side, and thus not take the log likelihood ratio (LLRs) corresponding to these symbols/REs into account further in the decoding process. Similarly, where the DCI is for PUSCH, the UE may skip transmission of the modulated symbols corresponding to the REs in the affected OFDM or discrete Fourier transform spread DFT-S-OFDM symbols.

In yet another embodiment, the UE may assume rate-matching of the PDSCH around the affected OFDM symbols, or may transmit PUSCH after rate-matching around the affected OFDM or DFT-S-OFDM symbols. However, this approach is susceptible to decoding failures due to potential mismatch in the rate-matching assumption between transmitter and receiver in case the G-C PDCCH is missed by the UE.

Note that the above rules also apply for semi-persistently scheduled (SPS) DL or UL transmissions or UL grant-free transmissions types 1 or 2.

In an embodiment, in the event of conflicts between SFI indication on the one hand, and control resource sets (CORESETs) that may be configured to the UE for PDCCH monitoring on the other hand, where the UE is expected to follow the indication in the SFI with respect to DL, UL and/or flexible symbols or slots, and further where a CORESET spans multiple symbols with time-first mapping of the control channel element to resource element groups (CCE-to-REGs), the UE may assume that the entire CORESET is dropped. Note that for the case of single-symbol PDCCH CORESETs, the UE may assume that the entire symbol is dropped.

In another embodiment, in the event of conflicts between SFI indication on the one hand, and PUCCH transmissions using one or multiple symbols on the other hand, in an embodiment, the UE may drop the transmission on the affected symbols only, thus puncturing the symbols. Alternatively, the entire PUCCH may be dropped.

Further, in an embodiment, a dropping behavior of the UE for a PUCCH may be defined depending on the type of uplink control information UCI carried by the PUCCH. For example, the UE may be configured or specified to drop the entire PUCCH in the case of CSI feedback or SR transmissions at least for slot-level SR opportunities, while for multi-symbol PUCCH carrying HARQ-ACK feedback, the affected symbols may be punctured, and only the unaffected symbols may be transmitted. The above may also depend on the PUCCH transmission duration. The UE may be configured or specified to drop the entire PUCCH if long PUCCH is used. For short PUCCH, the UE may be configured or specified to shift the short PUCCH to the next available UL symbols in the slot.

As noted previously, the UE may also be configured with semi-static DL/UL direction assignment with a certain switching periodicity via higher layer signaling. In such a case, where there is a conflict between the SFI indication and the semi-static assignment, the UE may, according to one embodiment, prioritize the semi-static assignment indicating DL or UL symbols over the SFI indication. For example, having been configured with a semi-static assignment, the UE may assume no conflicts and follow the semi-static assignment.

In the case of conflicts between the dynamically scheduled PDSCH/PUSCH on the one hand, and semi-persistently scheduled PDSCH/PUSCH or UL grant-free types 1 or 2, or semi-statically scheduled DL/UL directions, the UE may follow the semi-static assignments. Thus, in one embodiment, the UE may be configured to assume that the dynamically scheduled PDSCH is rate-matched around the resources scheduled using semi-static signaling in the conflicting symbols. For PUSCH, the UE may be configured to transmit by rate-matching the PUSCH around the resources scheduled using semi-static signaling in the conflicting symbols. Alternatively, the UE may be specified to assume a puncturing of PDSCH or PUSCH respectively in the affected symbols.

In one embodiment, the UE may be required to monitor for PDCCH in flexible resources or symbols configured via semi-static RRC signaling if configured with PDCCH monitoring occasions in such symbols and only if these symbols are within the first three symbols of a slot (in symbol indices #0, 1, 2). According to one embodiment, for PDCCH monitoring occasions in unknown or flexible symbols configured by semi-static RRC, the UE may not be required to monitor for PDCCH.

In one embodiment, a monitoring occasions indicating monitoring beyond the first three symbols of a slot may be associated only with CORESETs with a duration of one or two symbols, while monitoring occasions indicating monitoring within the first three symbols of a slot may be associated with CORESETs with a duration of one, two, or three symbols.

Further, to address low latency requirements while preserving maximal scheduling flexibility, some UEs may support PDCCH monitoring for any monitoring occasions that fall in unknown or flexible symbols configured by semi-static RRC signaling, depending on UE capabilities.

In another embodiment, the UE may be required to monitor for PDCCH in configured PDCCH monitoring occasions in unknown symbols indicated by GC PDCCH only if such symbols fall within the first three symbols of a slot.

In another embodiment, when a configured GC-PDCCH carrying dynamic SFI is not detected (i.e. by virtue of a detection erasure event), the UE may assume unknown dynamic SFI is received for all symbols in the current monitoring period, and the UE may be required to monitor for PDCCH in configured PDCCH monitoring occasions within the monitoring period only if such symbols are within the first three symbols of a slot.

In yet another embodiment, in the event a CORESET with multiple symbols is configured such that, for a certain monitoring occasion, some of the symbols are identified either as unknown or flexible by a semi-static DL/UL assignment, the UE may be required to monitor such a CORESET. Again, this behavior could be limited to monitoring occasions that occur within first three symbols of a slot. Alternatively, a UE may not be required to monitor such a CORESET with part of the symbols indicated as unknown by SFI carried by GC PDCCH.

However, in the event that a CORESET with multiple symbols is configured such that, for certain monitoring occasions, some of the symbols are identified as flexible by dynamic SFI indicated by GC PDCCH, the UE may monitor such a CORESET. Again, this behavior could be limited to monitoring occasions that occur within the first three symbols of a slot. Alternatively, a UE may not be required to monitor such a CORESET with part of the symbols indicated as flexile by SFI carried by GC PDCCH.

In the above, considering possibility of multi-slot CORESETs, in an embodiment, the monitoring occasions are specified to indicate the starting symbol of a CORESET.

It has been agreed that a UE may be configured to monitor for GC PDCCH carrying SFI using one or two configured PDCCH candidates at a configured aggregation level (AL). If the GC PDCCH payload is less than 11 bits, the GC PDCCH may be transmitted using Reed Muller (RM) code (instead of Polar code used for regular PDCCH) without CRC bits. In the latter case, in one embodiment, the gNodeB may configure the two PDCCH candidates as the resources to monitor for such GC PDCCH. Alternatively, the resources corresponding to only a first of the maximum two configured PDCCH candidates for GC PDCCH monitoring may be monitored by the UE for such a GC PDCCH transmitted using RM code without CRC bit addition. As yet another alternative, only one PDCCH candidate may be configured to a UE that is also configured with GC PDCCH with a payload that is less than 11 bits. A motivation behind the above is that, for upcoming symbols or slots, since the UE must decode, limiting the number of blind decoding candidates would increase system efficiency.

According to one embodiment, an apparatus, system and method are provided for a New Radio (NR) User Equipment. The apparatus includes a baseband processor including a radio frequency (RF) interface, and one or more processors coupled to the RF interface and configured to: decode a communication from a NR evolved Node B (gNodeB), the communication including information on configuration parameters of reserved physical resources confined within a bandwidth part (BWP) of a wireless channel, the configuration parameters including time and frequency resources; based on the communication, determine the reserved physical resources as being allocated reserved physical resources; and process signals received on, or for communication on, only physical resources not overlapping the allocated reserved physical resources.

According to some demonstrative embodiments, an apparatus, system and method are provided for a NR gNodeB. The apparatus includes a RF circuitry interface and one or more processors coupled to the RF circuitry interface. The one or more processors are configured to An apparatus of a New Radio (NR) evolved Node B (gNodeB), the apparatus including a radio frequency (RF) circuitry interface, and one or more processors coupled to the RF circuitry interface, the one or more processors to: determine physical resources confined within a bandwidth part (BWP) of a wireless channel as corresponding to reserved physical resources; encode, for transmission to a User Equipment (UE), a communication including information on configuration parameters of the reserved physical resources, the configuration parameters including time and frequency resources; and process signals received on, or for communication on, only physical resources not overlapping the allocated reserved physical resources.

Example networks and architectures that may be used to implement some demonstrative embodiments will be shown and described with respect to FIGS. 6-12 below.

Figure 6:
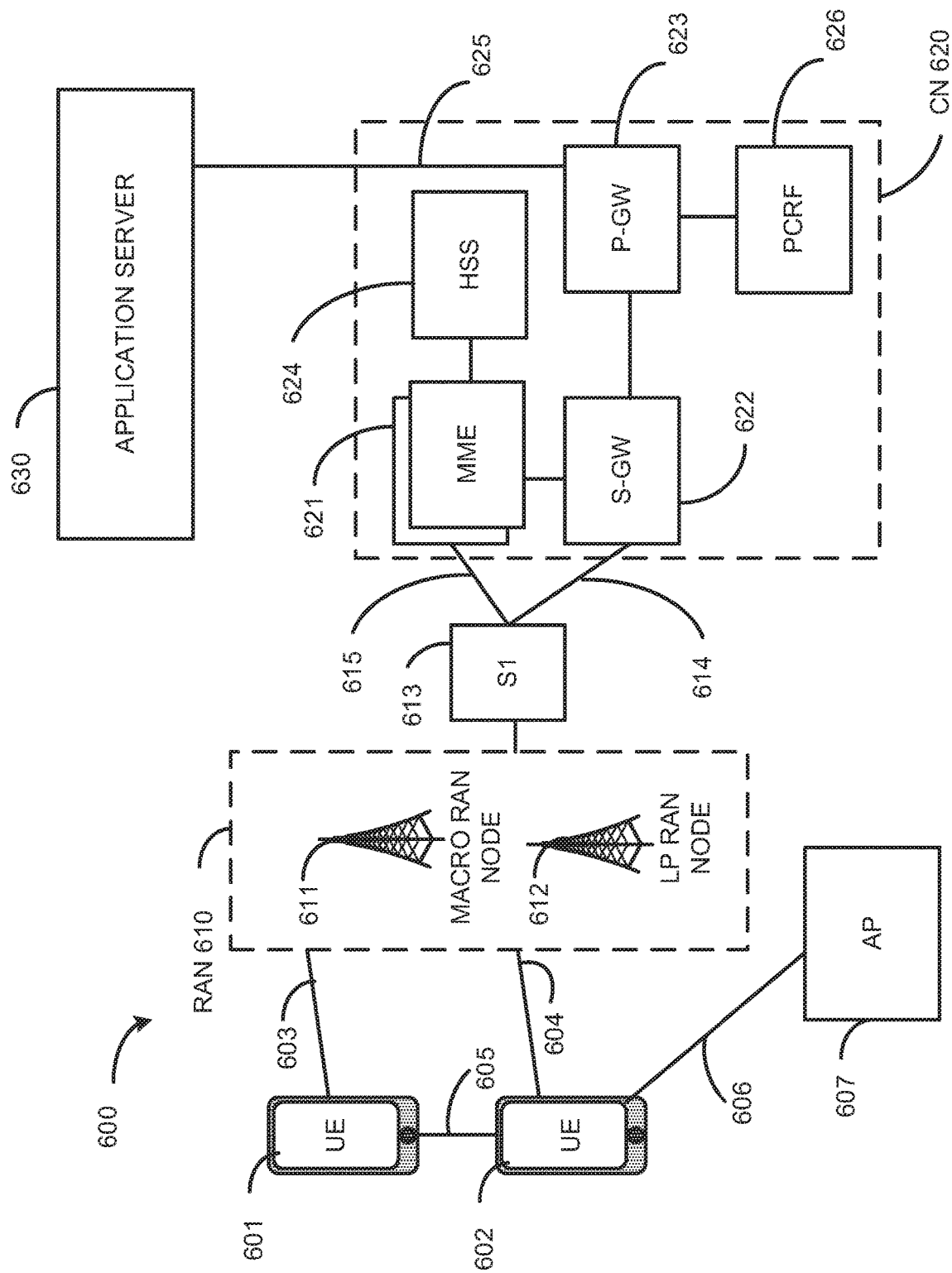
FIG. 6 depicts an architecture of a system 600 of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNodeB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
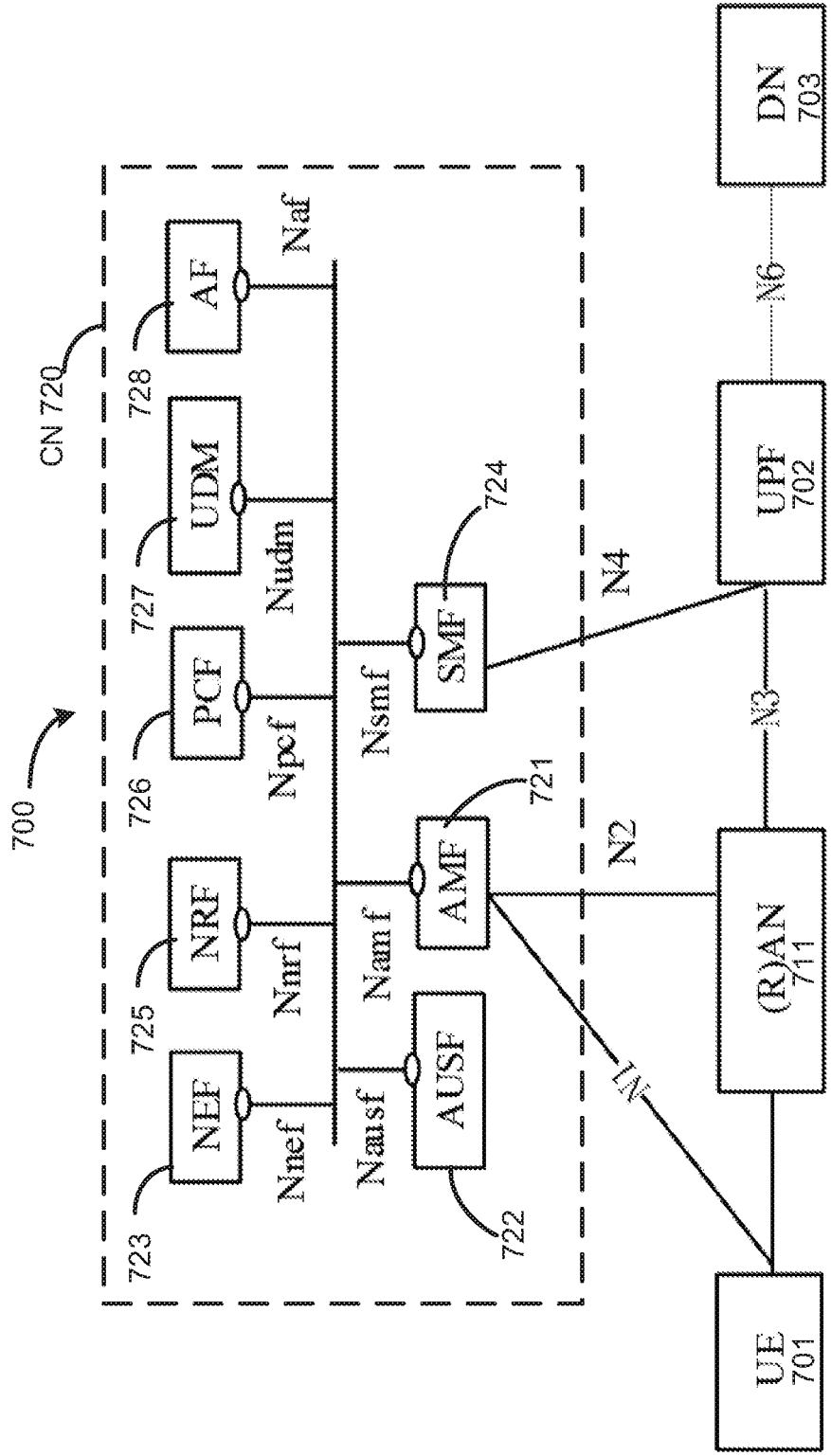
FIG. 7 depicts an architecture of a system of a network in accordance with one embodiment.

FIG. 7 illustrates an architecture of a system 700 of a network in accordance with some embodiments. The system 700 is shown to include a UE 701, which may be the same or similar to UEs 601 and 602 discussed previously; a RAN node 711, which may be the same or similar to RAN nodes 611 and 612 discussed previously; a User Plane Function (UPF) 702; a Data network (DN) 703, which may be, for example, operator services, Internet access or 3rd party services; and a 5G Core Network (5GC or CN) 720.

The CN 720 may include an Authentication Server Function (AUSF) 722; a Core Access and Mobility Management Function (AMF) 721; a Session Management Function (SMF) 724; a Network Exposure Function (NEF) 723; a Policy Control function (PCF) 726; a Network Function (NF) Repository Function (NRF) 725; a Unified Data Management (UDM) 727; and an Application Function (AF) 728. The CN 720 may also include other elements that are not shown, such as a Structured Data Storage network function (SDSF), an Unstructured Data Storage network function (UDSF), and the like.

The UPF 702 may act as an anchor point for intra-RAT and inter-RAT mobility, an external PDU session point of interconnect to DN 703, and a branching point to support multi-homed PDU session. The UPF 702 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 702 may include an uplink classifier to support routing traffic flows to a data network. The DN 703 may represent various network operator services, Internet access, or third party services. NY 703 may include, or be similar to application server 630 discussed previously.

The AUSF 722 may store data for authentication of UE 701 and handle authentication related functionality. The AUSF 722 may facilitate a common authentication framework for various access types.

The AMF 721 may be responsible for registration management (e.g., for registering UE 701, etc.), connection management, reachability management, mobility management, and lawful interception of AMF-related events, and access authentication and authorization. AMF 721 may provide transport for SM messages between and SMF 724, and act as a transparent proxy for routing SM messages. AMF 721 may also provide transport for short message service (SMS) messages between UE 701 and an SMS function (SMSF) (not shown by FIG. 7). AMF 721 may act as Security Anchor Function (SEA), which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a Security Context Management (SCM) function, which receives a key from the SEA that it uses to derive access-network specific keys. Furthermore, AMF 721 may be a termination point of RAN CP interface (N2 reference point), a termination point of NAS (NI) signaling, and perform NAS ciphering and integrity protection.

AMF 721 may also support NAS signaling with a UE 701 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 701 and AMF 721, and relay uplink and downlink user-plane packets between the UE 701 and UPF 702. The N3IWF also provides mechanisms for IPsec tunnel establishment with the UE 701.

The SMF 724 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 724 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 723 may provide means for securely exposing the services and capabilities provided by 3GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using a standardized interfaces. The stored information can then be re-exposed by the NEF 723 to other NFs and AFs, and/or used for other purposes such as analytics.

The NRF 725 may support service discovery functions, receive NF Discovery Requests from NF instances, and provide the information of the discovered NF instances to the NF instances. NRF 725 also maintains information of available NF instances and their supported services.

The PCF 726 may provide policy rules to control plane function(s) to enforce them, and may also support unified policy framework to govern network behavior. The PCF 726 may also implement a front end (FE) to access subscription information relevant for policy decisions in a UDR of UDM 727.

The UDM 727 may handle subscription-related information to support the network entities' handling of communication sessions, and may store subscription data of UE 701. The UDM 727 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 726. UDM 727 may also support SMS management, wherein an SMS-FE implements the similar application logic as discussed previously.

The AF 728 may provide application influence on traffic routing, access to the Network Capability Exposure (NCE), and interact with the policy framework for policy control. The NCE may be a mechanism that allows the 5GC and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for notification procedure that the UE 701 is available for SMS transfer (e.g., set a UE not reachable flag, and notifying UDM 727 when UE 701 is available for SMS).

The system 700 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 700 may include the following reference points: NI: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an NI I reference point between the AMF and SMF; etc. In some embodiments, the CN 720 may include an Nx interface, which is an inter-CN interface between the MME (e.g., MME 62 I) and the AMF 72 I in order to enable interworking between CN 720 and CN 620.

Although not shown by FIG. 7, system 700 may include multiple RAN nodes 711 wherein an Xn interface is defined between two or more RAN nodes 711 (e.g., gNBs and the like) that connecting to 5GC 720, between a RAN node 711 (e.g., gNB) connecting to 5GC 720 and an eNB (e.g., a RAN node 611 of FIG. 6), and/or between two eNBs connecting to 5GC 720.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
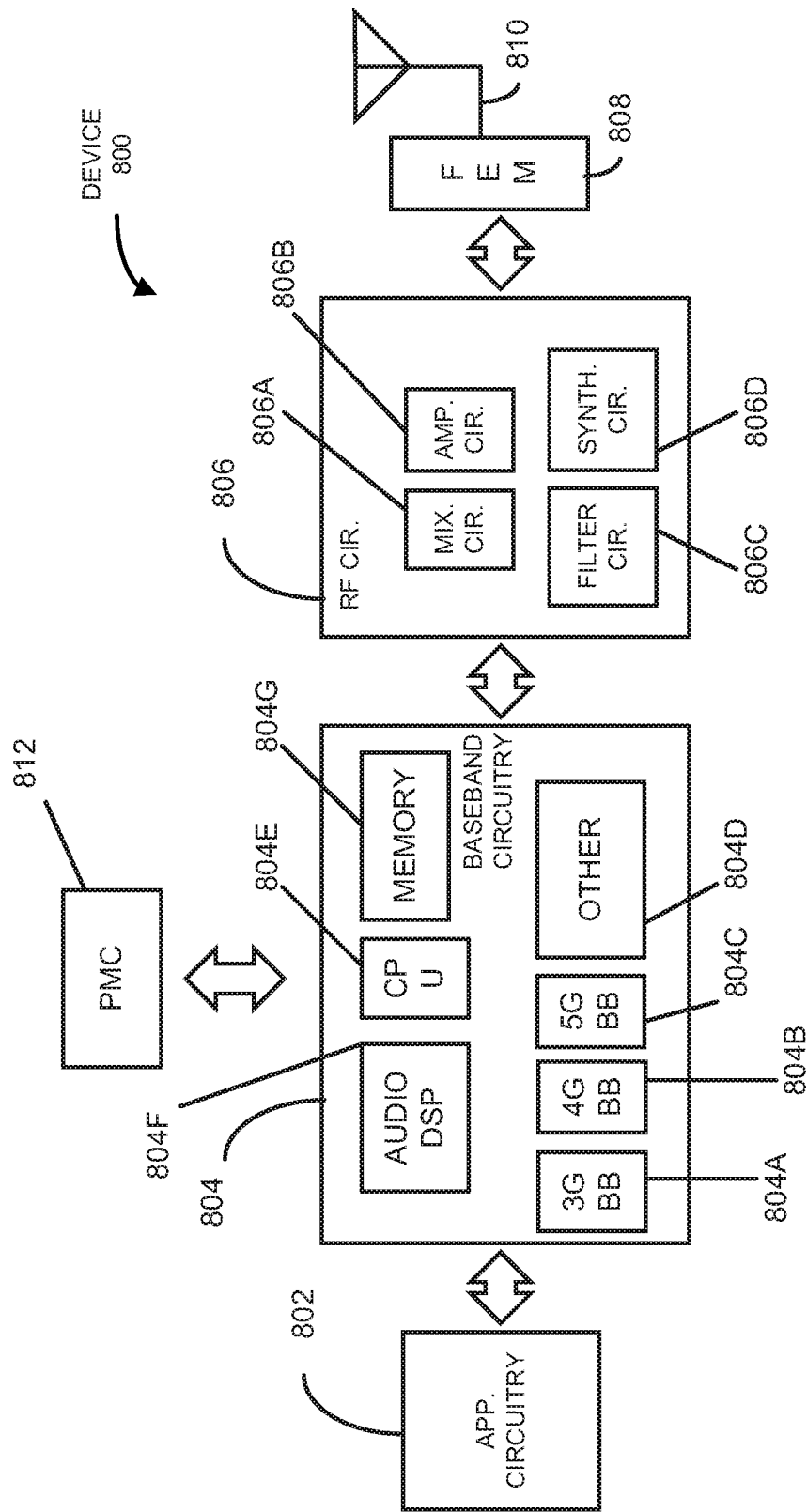
FIG. 8 depicts example components of a device 800 in accordance with some embodiments.

FIG. 8 illustrates example components of a device 800 in accordance with some embodiments. In some embodiments, the device 800 may include application processing circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application processing circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application processing circuitry 802 may include one or more application processors. For example, the application processing circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application processing circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application processing circuitry 802 for generation and processing of the baseband signals and for controlling operations of the RF circuitry 806. For example, in some embodiments, the baseband circuitry 804 may include one or more processors including a third generation (3G) baseband processing circuitry 804A, a fourth generation (4G) baseband processing circuitry 804B, a fifth generation (5G) baseband processing circuitry 804C, or other baseband processing circuitry(s) 804D for other existing generations, generations in development or to be developed in the future (e.g., second generation (2G), sixth generation (6G), etc.). The baseband circuitry 804 (e.g., one or more of baseband processing circuitries 804A-D) may handle various radio control functions that enable communication with one or more radio networks via the RF circuitry 806. In other embodiments, some or all of the functionality of baseband processing circuitry 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. The FFT may be provided by way of one or more memories coupled to the modulation/demodulation circuitry of the baseband circuitry, such as one or more random access memories to allow the performance of butterfly operations. In some embodiments, encoding/decoding circuitry of the baseband circuitry 804 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application processing circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature down conversion and up conversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down conversion and direct up conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage-controlled oscillator (VCO), although that is not a requirement. Divider control input may be provided by either the baseband circuitry 804 or the application processing circuitry 802 depending on the desired output frequency. In some embodiments, a divider control input (e.g., N) may be determined from a look-up table based on a channel indicated by the application processing circuitry 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application processing circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application processing circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
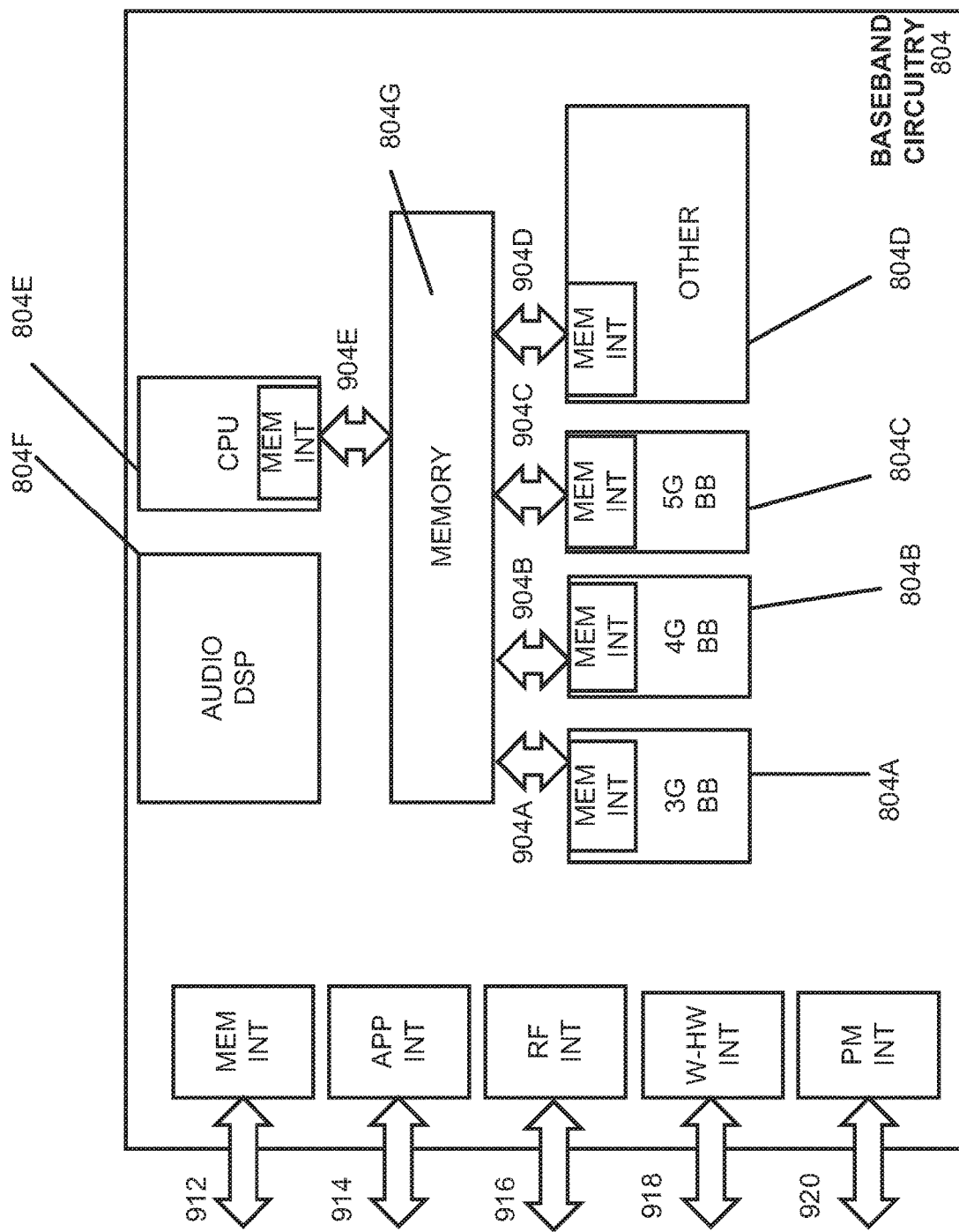
FIG. 9 depicts example interfaces of a baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application processing circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
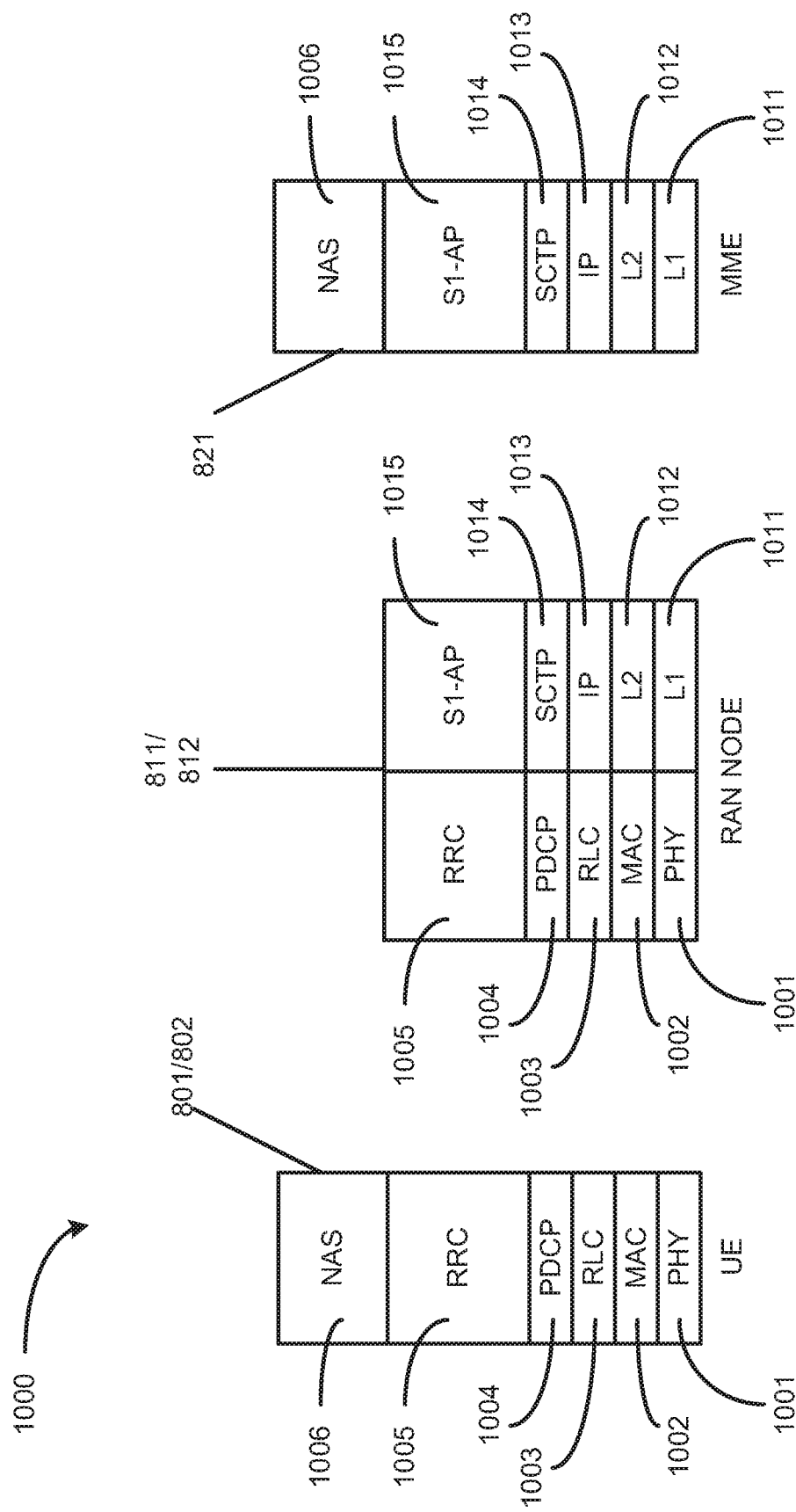
FIG. 10 depicts a control plane protocol stack in accordance with some embodiments.

FIG. 10 is an illustration of a control plane protocol stack in accordance with some embodiments. In this embodiment, a control plane 1000 is shown as a communications protocol stack between the UE 601 (or alternatively, the UE 602), the RAN node 611 (or alternatively, the RAN node 612), and the MME 621.

The PHY layer 1001 may transmit or receive information used by the MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as the RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1002 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1003 may operate in a plurality of modes of operation, including: Transparent Mode (TM), Unacknowledged Mode (UM), and Acknowledged Mode (AM). The RLC layer 1003 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1004 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBS) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBS may comprise one or more information elements (IEs), which may each comprise individual data fields or data structures.

The UE 601 and the RAN node 611 may utilize a Uu interface (e.g., an LTE-Uu interface) to exchange control plane data via a protocol stack comprising the PHY layer 1001, the MAC layer 1002, the RLC layer 1003, the PDCP layer 1004, and the RRC layer 1005.

The non-access stratum (NAS) protocols 1006 form the highest stratum of the control plane between the UE 601 and the MME 621. The NAS protocols 1006 support the mobility of the UE 601 and the session management procedures to establish and maintain IP connectivity between the UE 601 and the P-GW 623.

The S1 Application Protocol (S1-AP) layer 1015 may support the functions of the S1 interface and comprise Elementary Procedures (EPs). An EP is a unit of interaction between the RAN node 611 and the CN 620. The S1-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1014 may ensure reliable delivery of signaling messages between the RAN node 611 and the MME 621 based, in part, on the IP protocol, supported by the IP layer 1013. The L2 layer 1012 and the L1 layer 1011 may refer to communication links (e.g., wired or wireless) used by the RAN node and the MME to exchange information.

The RAN node 611 and the MME 621 may utilize an S1-MME interface to exchange control plane data via a protocol stack comprising the L1 layer 1011, the L2 layer 1012, the IP layer 1013, the SCTP layer 1014, and the S1-AP layer 1015.

Figure 11:
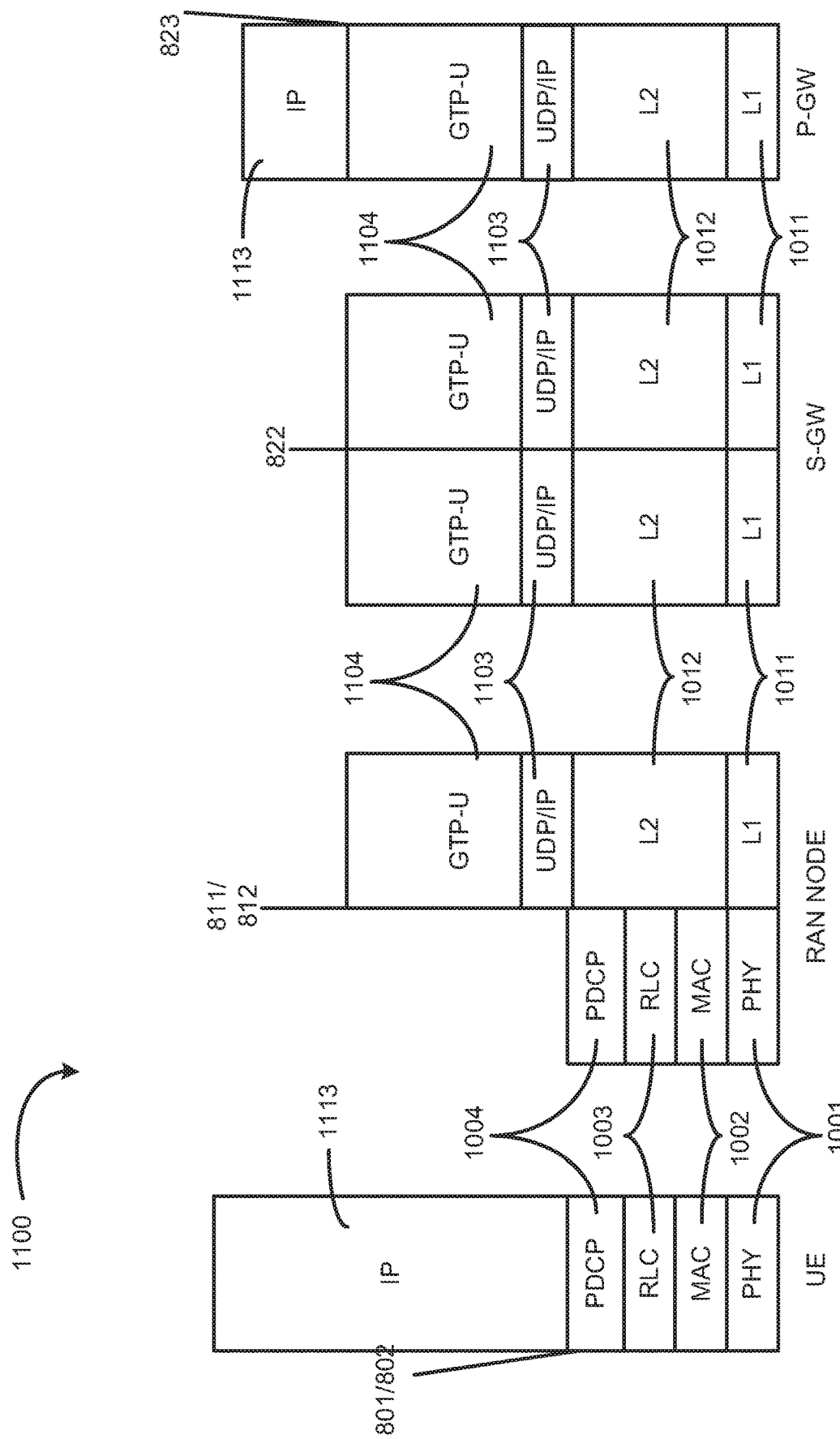
FIG. 11 depicts a user plane protocol stack in accordance with some embodiments.

FIG. 11 is an illustration of a user plane protocol stack in accordance with some embodiments. In this embodiment, a user plane 1100 is shown as a communications protocol stack between the UE 601 (or alternatively, the UE 602), the RAN node 611 (or alternatively, the RAN node 612), the S-GW 622, and the P-GW 623. The user plane 1100 may utilize at least some of the same protocol layers as the control plane 1000. For example, the UE 601 and the RAN node 611 may utilize a Uu interface (e.g., an LTE-Uu interface) to exchange user plane data via a protocol stack comprising the PHY layer 1001, the MAC layer 1002, the RLC layer 1003, the PDCP layer 1004.

The General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. The UDP and IP security (UDP/IP) layer 1103 may provide checksums for data integrity, port numbers for addressing different functions at the source and destination, and encryption and authentication on the selected data flows. The RAN node 611 and the S-GW 622 may utilize an S1-U interface to exchange user plane data via a protocol stack comprising the L1 layer 1011, the L2 layer 1012, the UDP/IP layer 1103, and the GTP-U layer 1104. The S-GW 622 and the P-GW 623 may utilize an 55/58a interface to exchange user plane data via a protocol stack comprising the L1 layer 1011, the L2 layer 1012, the UDP/IP layer 1103, and the GTP-U layer 1104. As discussed above with respect to FIG. 10, NAS protocols support the mobility of the UE 601 and the session management procedures to establish and maintain IP connectivity between the UE 601 and the P-GW 623.

Figure 12:
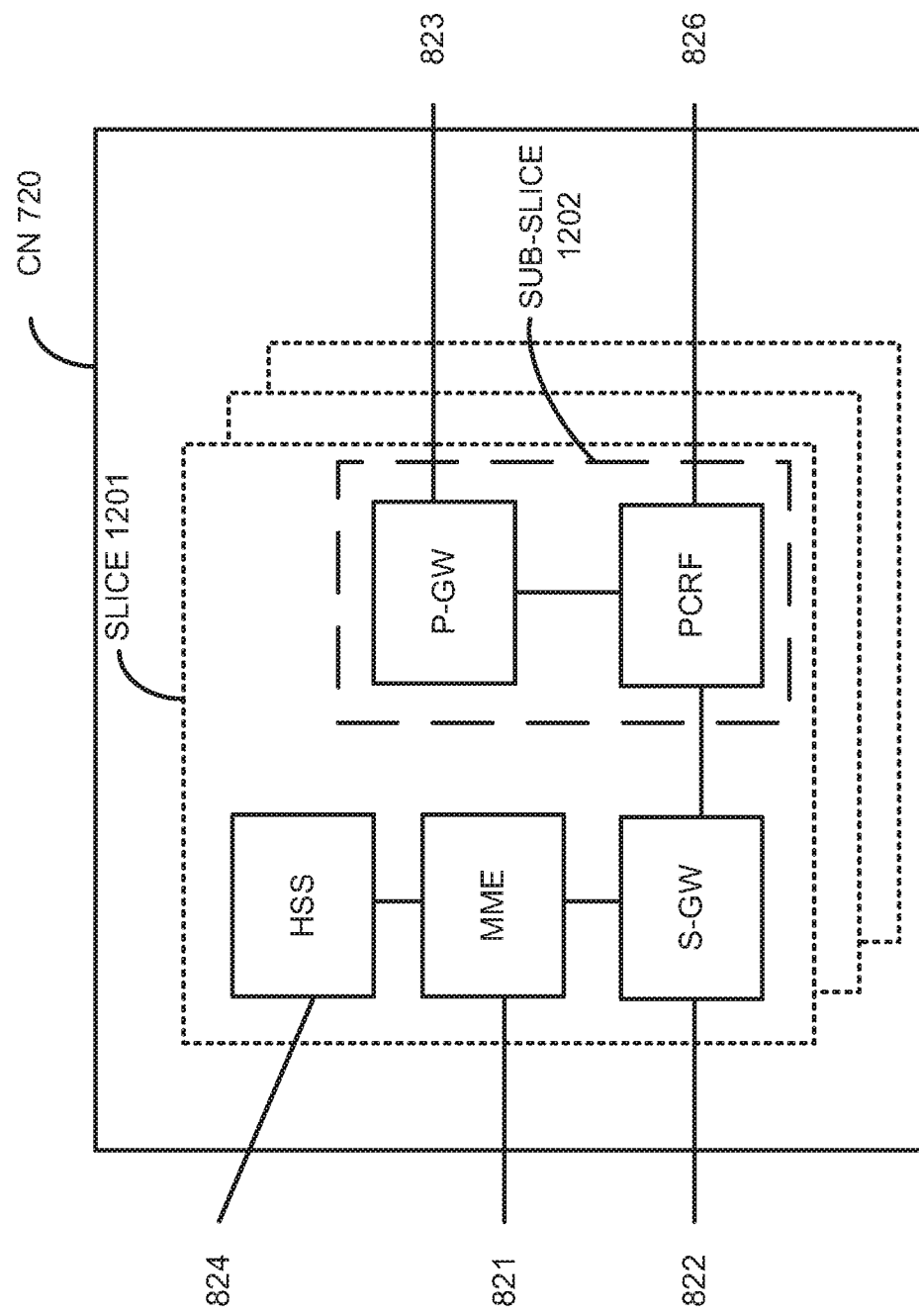
FIG. 12 depicts a block diagram illustrating components, according to some example embodiments, able to read instructions from a machine-readable or computer-readable medium and perform any one or more of the methodologies of embodiments described herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processing circuitry, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In some embodiments, the electronic device(s), network(s), system(s), chip(s) or component(s), or portions or implementations thereof, of any of the Figures shown and described herein may be configured to perform one or more processes, techniques, or methods as described herein, or portions thereof.

In some embodiments, the electronic device(s), network(s), system(s), chip(s) or component(s), or portions or implementations thereof, of FIGS. 6-12, or some other figure herein may be configured to perform one or more processes, techniques, or methods as described herein in relation to embodiments, or portions thereof.

EXAMPLES

Example 1 includes an apparatus of a New Radio (NR) User Equipment (UE), the apparatus including a radio frequency (RF) interface, and one or more processors coupled to the RF interface and configured to: decode a communication from a NR evolved Node B (gNodeB), the communication including information on configuration parameters of reserved physical resources confined within a bandwidth part (BWP) of a wireless channel, the configuration parameters including time and frequency resources; based on the communication, determine the reserved physical resources as being allocated reserved physical resources; and process signals received on, or for communication on, only physical resources not overlapping the allocated reserved physical resources.

Example 2 includes the subject matter of Example 1, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 3 includes the subject matter of Example 1, and optionally, wherein the information on configuration parameters includes information, in a time domain, of a periodicity of the reserved physical resources.

Example 4 includes the subject matter of Example 1, and optionally, wherein the information on configuration parameters includes information, in a time domain, on one or more symbol indices within a configured slot, the symbol index based on a reference numerology corresponding to a numerology of the BWP.

Example 5 includes the subject matter of Example 1, and optionally, wherein the communication comprises UE-specific signaling.

Example 6 includes the subject matter of any one of Examples 1-4, and optionally, wherein rein the information on configuration parameters includes information, in a frequency domain, on frequency resource allocation type based on resource block group (RBG), wherein a RBG comprises of one or more consecutive physical resource blocks (PRBs) in a frequency domain.

Example 7 includes the subject matter of Example 1, and optionally, wherein the configuration parameters include a first set of configuration parameters, the reserved physical resources include a first set of reserved physical resources, and the allocated reserved physical resources include allocated first reserved physical resources, the one or more processors further to: decode information on a second set of configuration parameters of a second set of reserved physical resources, the second configuration parameters including time and frequency resources; based on the second communication, determine the second set of reserved physical resources as being an allocated second set of reserved physical resources; and process signals received on, or for communication on, only physical resources not overlapping the allocated second set of reserved physical resources.

Example 8 includes the subject matter of Example 7, and optionally, wherein the information on the first set of configuration parameters includes a first index corresponding to the first set of reserved physical resources, and the information on the second set of configuration parameters includes a second index corresponding to the second set of reserved physical resources.

Example 9 includes the subject matter of Example 8, and optionally, wherein the communication is a first communication including semi-statically configured higher layer signaling including NR minimum system information (MSI), NR remaining minimum system information (RMSI), NR system information block (SIB), or UE-specific radio resource control (RRC) signaling, the one or more processors further being configured to: decode a second communication from the gNodeB including dynamic Layer 1 (L1) signaling comprising downlink control information (DCI), the second communication including information on at least one of the first index or the second index; based on the information on at least one of the first index or the second index in the second communication, determine at least one of the allocated first set of reserved physical resources or the allocated second set of reserved physical resources as corresponding to released reserved physical resources; and process signals received on, or for communication on, physical resources overlapping the released reserved physical resources.

Example 10 includes the subject matter of Example 9, and optionally, wherein the one or more processors is to assume a union of the allocated first set of reserved physical resources and the allocated second set of reserved physical resources.

Example 11 includes the subject matter of Example 9, and optionally, wherein at least one of the first communication and the second communication includes a UE-specific signaling or group-common signaling.

Example 12 includes the subject matter of Example 1, and optionally, wherein the one or more processors is further to: decode a Control Resource Set (CORESET) communication from the gNodeB, the CORESET communication corresponding to one or more symbols; determine from the CORESET communication that the UE is scheduled to monitor for reception a Physical Downlink Control Channel (PDCCH) from the gNodeB on the one or more symbols; decode a dynamic communication from the gNodeB indicating at least one symbol of the one or more symbols is to be an uplink symbol or a flexible symbol; and drop a monitoring for reception of the PDCCH on the one or more symbols.

Example 13 includes the subject matter of Example 1, and optionally, wherein the one or more processors is further to: decode a communication from the gNodeB indicating downlink (DL) semi-persistent scheduling (SPS); determine from the communication from the gNodeB that the UE is scheduled to receive a Physical Downlink Scheduled Channel (PDSCH) from the gNodeB on multiple slots following the DL SPS configuration; decode a communication from the gNodeB indicating at least some symbols of the multiple slots are to be uplink symbols; and drop a monitoring for reception of the PDSCH in only the slots with the at least some symbols. The communication from the gNodeB may be a DCI format 2_0 communication.

Example 14 includes the subject matter of Example 1, and optionally, wherein the one or more processors is further to: decode a communication from the gNodeB indicating Type 1 or Type 2 Configured Grant (CG) PUSCH resources; determine from the communication from the gNodeB that the UE is scheduled to transmit a Physical Uplink Scheduled Channel (PUSCH) to the gNodeB on multiple slots following the Type 1 or Type 2 Configured Grant (CG) PUSCH configuration; decode a communication from the gNodeB indicating at least some symbols of the multiple slots are to be downlink symbols; an drop a transmission of the PUSCH in only the slots with the at least some symbols.

Example 15 includes the subject matter of Example 1, and optionally, wherein the one or more processors is further to: decode a Control Resource Set (CORESET) communication from the gNodeB, the CORESET communication corresponding to one or more symbols; determine from the CORESET communication that the UE is scheduled to monitor for reception a Physical Downlink Control Channel (PDCCH) from the gNodeB on the one or more symbols; decode a dynamic communication from the gNodeB indicating at least one symbol of the one or more symbols is to be an uplink symbol or a flexible symbol; and drop a monitoring for reception of the PDCCH on the one or more symbols.

Example 16 includes the subject matter of Example 1, and optionally, wherein the one or more processors is further to: decode a Control Resource Set (CORESET) communication from the gNodeB, the CORESET communication corresponding to a plurality of symbols; determine from the CORESET communication that the UE is scheduled to monitor for reception a Physical Downlink Control Channel (PDCCH) from the gNodeB on the plurality of symbols; decode a semi-static communication from the gNodeB indicating at least one symbol of the plurality of symbols is to be a flexible symbol; and monitor for reception of the PDCCH on the one or more symbols including the at least one symbol regardless of the semi-static communication.

Example 17 includes the subject matter of Example 1, and optionally, wherein the one or more processors is further to: process a Physical Uplink Control Channel (PUCCH) for transmission of HARQ-ACK feedback to the gNodeB on one or more symbols in response to PDSCH scheduled via DL SPS or dynamic scheduling; decode a communication from the gNodeB indicating at least one symbol of the one or more symbols is to be a downlink symbol or a flexible symbol; and drop transmission of an entirety of the PUCCH on the one or more symbols. The communication from the gNodeB may include a DCI format_2.0 communication.

Example 18 includes the subject matter of Example 1, and optionally, wherein the one or more processors is further to: decode a semi-static communication from the gNodeB indicating, with a switching periodicity, downlink (DL) and uplink (UL) direction assignments for a plurality of symbols; and process signals received from or for transmission to the gNodeB on the symbols indicated as DL or UL direction respectively regardless of any dynamic communication from the gNodeB B indicating DL direction, UL direction or flexible assignments if the indicated direction conflicts with that indicated via the semi-static communication for one or more of the plurality of symbols.

Example 19 includes the subject matter of Example 1, and optionally, wherein the one or more processors is further to: decode a message from the gNodeB specifying resources corresponding to a first of a maximum of two configured candidates for Group Common Physical Downlink Control Channel (GC PDCCH) to be monitored by the UE; configure the UE based on the message; monitor the resources corresponding to the first of the maximum of two configured candidates for GC PDCCH, the first of the maximum of two configured candidates being transmitted using Reed Muller (RM) code without Cyclic Redundancy Check (CRC) addition; decode the first of the maximum of two configured candidates for GC PDCCH to determine where one or more symbols are identified as downlink (DL), uplink (UL) or flexible symbols; and communicate with the gNodeB based on an identification from the first of the maximum of two configured candidates for GC PDCCH of the one or more symbols as DL, UL or flexible.

Example 20 includes the subject matter of Example 1, and optionally, further including a front-end module (FEM) coupled to the RF interface.

Example 21 includes the subject matter of Example 20, and optionally, further including at least one antenna coupled to the FEM.

Example 22 includes a method to be performed at a New Radio (NR) User Equipment, the method including: decoding a communication from a NR evolved Node B (gNodeB), the communication including information on configuration parameters of reserved physical resources confined within a bandwidth part (BWP) of a wireless channel, the configuration parameters including time and frequency resources; based on the communication, determining the reserved physical resources as being allocated reserved physical resources; and processing signals received on, or for communication on, only physical resources not overlapping the allocated reserved physical resources.

Example 23 includes the subject matter of Example 22, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 24 includes the subject matter of Example 22, and optionally, wherein the information on configuration parameters includes information, in a time domain, of a periodicity of the reserved physical resources.

Example 25 includes the subject matter of Example 22, and optionally, wherein the information on configuration parameters includes information, in a time domain, on one or more symbol indices within a configured slot, the symbol index based on a reference numerology corresponding to a numerology of the BWP.

Example 26 includes the subject matter of Example 22, and optionally, wherein the communication comprises UE-specific signaling.

Example 27 includes the subject matter of any one of Examples 22-25, and optionally, wherein the information on configuration parameters includes information, in a frequency domain, on frequency resource allocation type based on resource block group (RBG), wherein a RBG comprises of one or more consecutive physical resource blocks (PRBs) in a frequency domain.

Example 28 includes the subject matter of Example 22, and optionally, wherein the configuration parameters include a first set of configuration parameters, the reserved physical resources include a first set of reserved physical resources, and the allocated reserved physical resources include allocated first reserved physical resources, the method further including: decoding information on a second set of configuration parameters of a second set of reserved physical resources, the second configuration parameters including time and frequency resources; based on the second communication, determining the second set of reserved physical resources as being an allocated second set of reserved physical resources; and processing signals received on, or for communication on, only physical resources not overlapping the allocated second set of reserved physical resources.

Example 29 includes the subject matter of Example 28, and optionally, wherein the information on the first set of configuration parameters includes a first index corresponding to the first set of reserved physical resources, and the information on the second set of configuration parameters includes a second index corresponding to the second set of reserved physical resources.

Example 30 includes the subject matter of Example 29, and optionally, wherein the communication is a first communication including semi-statically configured higher layer signaling including NR minimum system information (MSI), NR remaining minimum system information (RMSI), NR system information block (SIB), or UE-specific radio resource control (RRC) signaling, the method further including: decoding a second communication from the gNodeB including dynamic Layer 1 (L1) signaling comprising downlink control information (DCI), the second communication including information on at least one of the first index or the second index; based on the information on at least one of the first index or the second index in the second communication, determining at least one of the allocated first set of reserved physical resources or the allocated second set of reserved physical resources as corresponding to released reserved physical resources; and processing signals received on, or for communication on, physical resources overlapping the released reserved physical resources.

Example 31 includes the subject matter of Example 30, and optionally, further including assuming a union of the allocated first set of reserved physical resources and the allocated second set of reserved physical resources.

Example 32 includes the subject matter of Example 30, and optionally, wherein at least one of the first communication and the second communication includes a UE-specific signaling or group-common signaling.

Example 33 includes the subject matter of Example 22, and optionally, further including: decoding a Control Resource Set (CORESET) communication from the gNodeB, the CORESET communication corresponding to one or more symbols; determine from the CORESET communication that the UE is scheduled to monitor for reception a Physical Downlink Control Channel (PDCCH) from the gNodeB on the one or more symbols; decoding a dynamic communication from the gNodeB indicating at least one symbol of the one or more symbols is to be an uplink symbol or a flexible symbol; and dropping a monitoring for reception of the PDCCH on the one or more symbols.

Example 34 includes the subject matter of Example 22, and optionally, further including: decoding a communication from the gNodeB indicating downlink (DL) semi-persistent scheduling (SPS); determining from the communication from the gNodeB that the UE is scheduled to receive a Physical Downlink Scheduled Channel (PDSCH) from the gNodeB on multiple slots following the DL SPS configuration; decoding a communication from the gNodeB indicating at least some symbols of the multiple slots are to be uplink symbols; and dropping a monitoring for reception of the PDSCH in only the slots with the at least some symbols. The communication from the gNodeB may include a DCI format 2_0 communication.

Example 35 includes the subject matter of Example 22, and optionally, further including: decoding a communication from the gNodeB indicating Type 1 or Type 2 Configured Grant (CG) PUSCH resources; determine from the communication from the gNodeB that the UE is scheduled to transmit a Physical Uplink Scheduled Channel (PUSCH) to the gNodeB on multiple slots following the Type 1 or Type 2 Configured Grant (CG) PUSCH configuration; decoding a communication from the gNodeB indicating at least some symbols of the multiple slots are to be downlink symbols; and dropping a transmission of the PUSCH in only the slots with the at least some symbols.

Example 36 includes the subject matter of Example 22, and optionally, further including: decoding a Control Resource Set (CORESET) communication from the gNodeB, the CORESET communication corresponding to one or more symbols; determining from the CORESET communication that the UE is scheduled to monitor for reception a Physical Downlink Control Channel (PDCCH) from the gNodeB on the one or more symbols; decoding a dynamic communication from the gNodeB indicating at least one symbol of the one or more symbols is to be an uplink symbol or a flexible symbol; and dropping a monitoring for reception of the PDCCH on the one or more symbols.

Example 37 includes the subject matter of Example 22, and optionally, further including: decoding a Control Resource Set (CORESET) communication from the gNodeB, the CORESET communication corresponding to a plurality of symbols; determining from the CORESET communication that the UE is scheduled to monitor for reception a Physical Downlink Control Channel (PDCCH) from the gNodeB on the plurality of symbols; decoding a semi-static communication from the gNodeB indicating at least one symbol of the plurality of symbols is to be a flexible symbol; and monitoring for reception of the PDCCH on the one or more symbols including the at least one symbol regardless of the semi-static communication.

Example 38 includes the subject matter of Example 22, and optionally, further including: processing a Physical Uplink Control Channel (PUCCH) for transmission of HARQ-ACK feedback to the gNodeB on one or more symbols in response to PDSCH scheduled via DL SPS or dynamic scheduling; decoding a communication from the gNodeB indicating at least one symbol of the one or more symbols is to be a downlink symbol or a flexible symbol; and dropping transmission of an entirety of the PUCCH on the one or more symbols. The communication from the gNodeB may include a DCI format_2.0 communication.

Example 39 includes the subject matter of Example 22, and optionally, further including: decoding a semi-static communication from the gNodeB indicating, with a switching periodicity, downlink (DL) and uplink (UL) direction assignments for a plurality of symbols; and processing signals received from or for transmission to the gNodeB on the symbols indicated as DL or UL direction respectively regardless of any dynamic communication from the gNodeB B indicating DL direction, UL direction or flexible assignments if the indicated direction conflicts with that indicated via the semi-static communication for one or more of the plurality of symbols.

Example 40 includes the subject matter of Example 22, and optionally, further including: decoding a message from the gNodeB specifying resources corresponding to a first of a maximum of two configured candidates for Group Common Physical Downlink Control Channel (GC PDCCH) to be monitored by the UE; configuring the UE based on the message; monitoring the resources corresponding to the first of the maximum of two configured candidates for GC PDCCH, the first of the maximum of two configured candidates being transmitted using Reed Muller (RM) code without Cyclic Redundancy Check (CRC) addition; decoding the first of the maximum of two configured candidates for GC PDCCH to determine where one or more symbols are identified as downlink (DL), uplink (UL) or flexible symbols; and communicating with the gNodeB based on an identification from the first of the maximum of two configured candidates for GC PDCCH of the one or more symbols as DL, UL or flexible.

Example 41 includes a product comprising one or more computer-readable storage media comprising computer-executable instructions operable to, when executed by one or more processors of a New Radio (NR) User Equipment (UE), enable the one or more processors to implement operations at the UE, the operations including: decoding a communication from a NR evolved Node B (gNodeB), the communication including information on configuration parameters of reserved physical resources confined within a bandwidth part (BWP) of a wireless channel, the configuration parameters including time and frequency resources; based on the communication, determining the reserved physical resources as being allocated reserved physical resources; and processing signals received on, or for communication on, only physical resources not overlapping the allocated reserved physical resources.

Example 42 includes the subject matter of Example 41, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 43 includes the subject matter of Example 41, and optionally, wherein the information on configuration parameters includes information, in a time domain, of a periodicity of the reserved physical resources.

Example 44 includes the subject matter of Example 41, and optionally, wherein the information on configuration parameters includes information, in a time domain, on one or more symbol indices within a configured slot, the symbol index based on a reference numerology corresponding to a numerology of the BWP.

Example 45 includes the subject matter of Example 41, and optionally, wherein the communication comprises UE-specific signaling.

Examples 46 includes the subject matter of any one of Examples 41-44, wherein the information on configuration parameters includes information, in a frequency domain, on frequency resource allocation type based on resource block group (RBG), wherein a RBG comprises of one or more consecutive physical resource blocks (PRBs) in a frequency domain.

Example 47 includes the subject matter of Example 41, and optionally, wherein the configuration parameters include a first set of configuration parameters, the reserved physical resources include a first set of reserved physical resources, and the allocated reserved physical resources include allocated first reserved physical resources, wherein the operations further include: decoding information on a second set of configuration parameters of a second set of reserved physical resources, the second configuration parameters including time and frequency resources; and based on the second communication, determining the second set of reserved physical resources as being an allocated second set of reserved physical resources; and processing signals received on, or for communication on, only physical resources not overlapping the allocated second set of reserved physical resources.

Example 48 includes the subject matter of Example 47, and optionally, wherein the information on the first set of configuration parameters includes a first index corresponding to the first set of reserved physical resources, and the information on the second set of configuration parameters includes a second index corresponding to the second set of reserved physical resources.

Example 49 includes the subject matter of Example 48, and optionally, wherein the communication is a first communication including semi-statically configured higher layer signaling including NR minimum system information (MSI), NR remaining minimum system information (RMSI), NR system information block (SIB), or UE-specific radio resource control (RRC) signaling, wherein the operations further include: decoding a second communication from the gNodeB including dynamic Layer 1 (L1) signaling comprising downlink control information (DCI), the second communication including information on at least one of the first index or the second index; based on the information on at least one of the first index or the second index in the second communication, determining at least one of the allocated first set of reserved physical resources or the allocated second set of reserved physical resources as corresponding to released reserved physical resources; and processing signals received on, or for communication on, physical resources overlapping the released reserved physical resources.

Example 50 includes the subject matter of Example 49, and optionally, wherein the operations further include assuming a union of the allocated first set of reserved physical resources and the allocated second set of reserved physical resources.

Example 51 includes the subject matter of Example 49, and optionally, wherein at least one of the first communication and the second communication includes a UE-specific signaling or group-common signaling.

Example 52 includes the subject matter of Example 41, and optionally, wherein the operations further include: decoding a Control Resource Set (CORESET) communication from the gNodeB, the CORESET communication corresponding to one or more symbols; determining from the CORESET communication that the UE is scheduled to monitor for reception a Physical Downlink Control Channel (PDCCH) from the gNodeB on the one or more symbols; decoding a dynamic communication from the gNodeB indicating at least one symbol of the one or more symbols is to be an uplink symbol or a flexible symbol; and dropping a monitoring for reception of the PDCCH on the one or more symbols.

Example 53 includes the subject matter of Example 41, and optionally, wherein the operations further include: decoding a communication from the gNodeB indicating downlink (DL) semi-persistent scheduling (SPS); determining from the communication from the gNodeB that the UE is scheduled to receive a Physical Downlink Scheduled Channel (PDSCH) from the gNodeB on multiple slots following the DL SPS configuration; decoding a communication from the gNodeB indicating at least some symbols of the multiple slots are to be uplink symbols; and dropping a monitoring for reception of the PDSCH in only the slots with the at least some symbols.

Example 54 includes the subject matter of Example 41, and optionally, wherein the operations further include: decoding a communication from the gNodeB indicating Type 1 or Type 2 Configured Grant (CG) PUSCH resources; determine from the communication from the gNodeB that the UE is scheduled to transmit a Physical Uplink Scheduled Channel (PUSCH) to the gNodeB on multiple slots following the Type 1 or Type 2 Configured Grant (CG) PUSCH configuration; decoding a communication from the gNodeB indicating at least some symbols of the multiple slots are to be downlink symbols; and dropping a transmission of the PUSCH in only the slots with the at least some symbols.

Example 55 includes the subject matter of Example 41, and optionally, wherein the operations further include: decoding a Control Resource Set (CORESET) communication from the gNodeB, the CORESET communication corresponding to one or more symbols; determining from the CORESET communication that the UE is scheduled to monitor for reception a Physical Downlink Control Channel (PDCCH) from the gNodeB on the one or more symbols; decoding a dynamic communication from the gNodeB indicating at least one symbol of the one or more symbols is to be an uplink symbol or a flexible symbol; and dropping a monitoring for reception of the PDCCH on the one or more symbols.

Example 56 includes the subject matter of Example 41, and optionally, wherein the operations further include: decoding a Control Resource Set (CORESET) communication from the gNodeB, the CORESET communication corresponding to a plurality of symbols; determining from the CORESET communication that the UE is scheduled to monitor for reception a Physical Downlink Control Channel (PDCCH) from the gNodeB on the plurality of symbols; decoding a semi-static communication from the gNodeB indicating at least one symbol of the plurality of symbols is to be a flexible symbol; and monitoring for reception of the PDCCH on the one or more symbols including the at least one symbol regardless of the semi-static communication.

Example 57 includes the subject matter of Example 41, and optionally, wherein the operations further include: processing a Physical Uplink Control Channel (PUCCH) for transmission of HARQ-ACK feedback to the gNodeB on one or more symbols in response to PDSCH scheduled via DL SPS or dynamic scheduling; decoding a communication from the gNodeB indicating at least one symbol of the one or more symbols is to be a downlink symbol or a flexible symbol; and dropping transmission of an entirety of the PUCCH on the one or more symbols. The communication from the gNodeB may include a DCI format_2.0 communication.

Example 58 includes the subject matter of Example 41, and optionally, wherein the operations further include: decoding a semi-static communication from the gNodeB indicating, with a switching periodicity, downlink (DL) and uplink (UL) direction assignments for a plurality of symbols; and processing signals received from or for transmission to the gNodeB on the symbols indicated as DL or UL direction respectively regardless of any dynamic communication from the gNodeB B indicating DL direction, UL direction or flexible assignments if the indicated direction conflicts with that indicated via the semi-static communication for one or more of the plurality of symbols.

Example 59 includes the subject matter of Example 41, and optionally, wherein the operations further include: decoding a message from the gNodeB specifying resources corresponding to a first of a maximum of two configured candidates for Group Common Physical Downlink Control Channel (GC PDCCH) to be monitored by the UE; configuring the UE based on the message; monitoring the resources corresponding to the first of the maximum of two configured candidates for GC PDCCH, the first of the maximum of two configured candidates being transmitted using Reed Muller (RM) code without Cyclic Redundancy Check (CRC) addition; decoding the first of the maximum of two configured candidates for GC PDCCH to determine where one or more symbols are identified as downlink (DL), uplink (UL) or flexible symbols; and communicating with the gNodeB based on an identification from the first of the maximum of two configured candidates for GC PDCCH of the one or more symbols as DL, UL or flexible.

Example 60 includes an apparatus of a New Radio (NR) User Equipment (UE), the apparatus including: means for decoding a communication from a NR evolved Node B (gNodeB), the communication including information on configuration parameters of reserved physical resources confined within a bandwidth part (BWP) of a wireless channel, the configuration parameters including time and frequency resources; means for determining, based on the communication, the reserved physical resources as being allocated reserved physical resources; and means for processing signals received on, or for communication on, only physical resources not overlapping the allocated reserved physical resources.

Example 61 includes the subject matter of Example 60, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 62 includes the subject matter of Example 60, and optionally, wherein the information on configuration parameters includes information, in a time domain, of a periodicity of the reserved physical resources.

Example 63 includes the subject matter of Example 60, and optionally, wherein the information on configuration parameters includes information, in a time domain, on one or more symbol indices within a configured slot, the symbol index based on a reference numerology corresponding to a numerology of the BWP.

Example 64 includes an apparatus of a New Radio (NR) evolved Node B (gNodeB), the apparatus including a radio frequency (RF) circuitry interface, and one or more processors coupled to the RF circuitry interface, the one or more processors to: determine physical resources confined within a bandwidth part (BWP) of a wireless channel as corresponding to reserved physical resources; encode, for transmission to a User Equipment (UE), a communication including information on configuration parameters of the reserved physical resources, the configuration parameters including time and frequency resources; and process signals received on, or for communication on, only physical resources not overlapping the allocated reserved physical resources.

Example 65 includes the subject matter of Example 64, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 66 includes the subject matter of Example 64, and optionally, wherein the information on configuration parameters includes information, in a time domain, of a periodicity of the reserved physical resources.

Example 67 includes the subject matter of Example 64, and optionally, wherein the information on configuration parameters includes information, in a time domain, on one or more symbol indices within a configured slot, the symbol index based on a reference numerology corresponding to a numerology of the BWP.

Example 68 includes the subject matter of Example 64, and optionally, wherein the communication comprises UE-specific signaling.

Example 69 includes the subject matter of any one of Examples 64-67, and optionally, wherein herein the information on configuration parameters includes information, in a frequency domain, on frequency resource allocation type based on resource block group (RBG), wherein a RBG comprises of one or more consecutive physical resource blocks (PRBs) in a frequency domain.

Example 70 includes the subject matter of Example 64, and optionally, wherein the configuration parameters include a first set of configuration parameters, and the reserved physical resources include a first set of reserved physical resources, the one or more processors further to: encode, for transmission to the UE, information on a second set of configuration parameters of a second set of reserved physical resources, the second configuration parameters including time and frequency resources; and process signals received on, or for communication on, only physical resources not overlapping the second set of reserved physical resources.

Example 71 includes the subject matter of Example 70, and optionally, wherein the information on the first set of configuration parameters includes a first index corresponding to the first set of reserved physical resources, and the information on the second set of configuration parameters includes a second index corresponding to the second set of reserved physical resources.

Example 72 includes the subject matter of Example 71, and optionally, wherein the communication is a first communication including semi-statically configured higher layer signaling including NR minimum system information (MSI), NR remaining minimum system information (RMSI), NR system information block (SIB), or UE-specific radio resource control (RRC) signaling, the one or more processors further being configured to: encode, for transmission to the UE, a second communication including dynamic Layer 1 (L1) signaling comprising downlink control information (DCI), the DCI including information, using at least one of the first index or the second index, to indicate at least one of the first set of reserved physical resources or the second set of reserved physical resources as corresponding to released reserved physical resources; and process signals received on, or for communication on, physical resources overlapping the released reserved physical resources.

Example 73 includes the subject matter of Example 72, and optionally, wherein the one or more processors is to encode the DCI regardless of any priority of the first set and the second set relative to one another.

Example 74 includes the subject matter of Example 72, and optionally, wherein at least one of the first communication and the second communication includes a UE-specific signaling or group-common signaling.

Example 75 includes the subject matter of Example 64, and optionally, wherein the one or more processors is further to: encode, for transmission to the UE, a message specifying resources corresponding to a first of a maximum of two configured candidates for Group Common Physical Downlink Control Channel (GC PDCCH) to be monitored by the UE, the first of the maximum of two configured candidates to use Reed Muller (RM) coding without Cyclic Redundancy Check (CRC) addition; configure the UE based on the message; encode, for transmission to the UE, the first of the maximum of two configured candidates for GC PDCCH; and communicate with the UE based on an identification within the first of the maximum of two configured candidates for GC PDCCH of one or more symbols as DL, UL or flexible.

Example 76 includes the subject matter of Example 64, and optionally, wherein the one or more processors is to encode, for transmission to the UE, a synchronization signal (SS) block regardless of any overlapping reserved physical resources.

Example 77 includes the subject matter of Example 64, and optionally, wherein the one or more processor is to encode, for transmission to the UE, reference signals regardless of any overlapping reserved physical resources.

Example 78 includes the subject matter of Example 64, and optionally, further including one or more antennas coupled to the RF circuitry interface.

Example 79 includes a method to be performed at a New Radio (NR) evolved Node B (gNodeB), the method including: determining physical resources confined within a bandwidth part (BWP) of a wireless channel as corresponding to reserved physical resources; encoding, for transmission to a User Equipment (UE), a communication including information on configuration parameters of the reserved physical resources, the configuration parameters including time and frequency resources; and processing signals received on, or for communication on, only physical resources not overlapping the allocated reserved physical resources.

Example 80 includes the subject matter of Example 79, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 81 includes the subject matter of Example 79, and optionally, wherein the information on configuration parameters includes information, in a time domain, of a periodicity of the reserved physical resources.

Example 82 includes the subject matter of Example 79, and optionally, wherein the information on configuration parameters includes information, in a time domain, on one or more symbol indices within a configured slot, the symbol index based on a reference numerology corresponding to a numerology of the BWP.

Example 83 includes the subject matter of Example 79, and optionally, wherein the communication comprises UE-specific signaling.

Example 84 includes the subject matter of any one of Examples 79-82, and optionally, wherein the information on configuration parameters includes information, in a frequency domain, on frequency resource allocation type based on resource block group (RBG), wherein a RBG comprises of one or more consecutive physical resource blocks (PRBs) in a frequency domain.

Example 85 includes the subject matter of Example 79, and optionally, wherein the configuration parameters include a first set of configuration parameters, and the reserved physical resources include a first set of reserved physical resources, the method further including: encoding, for transmission to the UE, information on a second set of configuration parameters of a second set of reserved physical resources, the second configuration parameters including time and frequency resources; and processing signals received on, or for communication on, only physical resources not overlapping the second set of reserved physical resources.

Example 86 includes the subject matter of Example 85, and optionally, wherein the information on the first set of configuration parameters includes a first index corresponding to the first set of reserved physical resources, and the information on the second set of configuration parameters includes a second index corresponding to the second set of reserved physical resources.

Example 87 includes the subject matter of Example 86, and optionally, wherein the communication is a first communication including semi-statically configured higher layer signaling including NR minimum system information (MSI), NR remaining minimum system information (RMSI), NR system information block (SIB), or UE-specific radio resource control (RRC) signaling, the Example further including: encoding, for transmission to the UE, a second communication including dynamic Layer 1 (L1) signaling comprising downlink control information (DCI), the DCI including information, using at least one of the first index or the second index, to indicate at least one of the first set of reserved physical resources or the second set of reserved physical resources as corresponding to released reserved physical resources; and processing signals received on, or for communication on, physical resources overlapping the released reserved physical resources.

Example 88 includes the subject matter of Example 87, and optionally, further including encoding the DCI regardless of any priority of the first set and the second set relative to one another.

Example 89 includes the subject matter of Example 87, and optionally, wherein at least one of the first communication and the second communication includes a UE-specific signaling or group-common signaling.

Example 90 includes the subject matter of Example 79, and optionally, further including: encoding, for transmission to the UE, a message specifying resources corresponding to a first of a maximum of two configured candidates for Group Common Physical Downlink Control Channel (GC PDCCH) to be monitored by the UE, the first of the maximum of two configured candidates to use Reed Muller (RM) coding without Cyclic Redundancy Check (CRC) addition; configuring the UE based on the message; encoding, for transmission to the UE, the first of the maximum of two configured candidates for GC PDCCH; and communicating with the UE based on an identification within the first of the maximum of two configured candidates for GC PDCCH of one or more symbols as DL, UL or flexible.

Example 91 includes the subject matter of Example 79, and optionally, further including encoding, for transmission to the UE, a synchronization signal (SS) block regardless of any overlapping reserved physical resources.

Example 92 includes a product comprising one or more computer-readable storage media comprising computer-executable instructions operable to, when executed by one or more processors of a New Radio (NR) evolved Node B (gNodeB), enable the one or more processors to implement operations at the gNodeB, the operations including: determining physical resources confined within a bandwidth part (BWP) of a wireless channel as corresponding to reserved physical resources; encoding, for transmission to a User Equipment (UE), a communication including information on configuration parameters of the reserved physical resources, the configuration parameters including time and frequency resources; and processing signals received on, or for communication on, only physical resources not overlapping the allocated reserved physical resources.

Example 93 includes the subject matter of Example 92, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 94 includes the subject matter of Example 92, and optionally, wherein the information on configuration parameters includes information, in a time domain, of a periodicity of the reserved physical resources.

Example 95 includes the subject matter of Example 92, and optionally, wherein the information on configuration parameters includes information, in a time domain, on one or more symbol indices within a configured slot, the symbol index based on a reference numerology corresponding to a numerology of the BWP.

Example 96 includes the subject matter of Example 92, and optionally, wherein the communication comprises UE-specific signaling.

Example 97 includes the subject matter of any one of Examples 92-95, wherein the information on configuration parameters includes information, in a frequency domain, on frequency resource allocation type based on resource block group (RBG), wherein a RBG comprises of one or more consecutive physical resource blocks (PRBs) in a frequency domain.

Example 98 includes the subject matter of Example 92, and optionally, wherein the configuration parameters include a first set of configuration parameters, and the reserved physical resources include a first set of reserved physical resources, the operations further including: encoding, for transmission to the UE, information on a second set of configuration parameters of a second set of reserved physical resources, the second configuration parameters including time and frequency resources; and processing signals received on, or for communication on, only physical resources not overlapping the second set of reserved physical resources.

Example 99 includes the subject matter of Example 98, and optionally, wherein the information on the first set of configuration parameters includes a first index corresponding to the first set of reserved physical resources, and the information on the second set of configuration parameters includes a second index corresponding to the second set of reserved physical resources.

Example 100 includes the subject matter of Example 99, and optionally, wherein the communication is a first communication including semi-statically configured higher layer signaling including NR minimum system information (MSI), NR remaining minimum system information (RMSI), NR system information block (SIB), or UE-specific radio resource control (RRC) signaling, the operations further including: encoding, for transmission to the UE, a second communication including dynamic Layer 1 (L1) signaling comprising downlink control information (DCI), the DCI including information, using at least one of the first index or the second index, to indicate at least one of the first set of reserved physical resources or the second set of reserved physical resources as corresponding to released reserved physical resources; and processing signals received on, or for communication on, physical resources overlapping the released reserved physical resources.

Example 101 includes the subject matter of Example 100, and optionally, further including encoding the DCI regardless of any priority of the first set and the second set relative to one another.

Example 102 includes the subject matter of Example 100, and optionally, wherein at least one of the first communication and the second communication includes a UE-specific signaling or group-common signaling.

Example 103 includes the subject matter of Example 92, and optionally, the operations further including: encoding, for transmission to the UE, a message specifying resources corresponding to a first of a maximum of two configured candidates for Group Common Physical Downlink Control Channel (GC PDCCH) to be monitored by the UE, the first of the maximum of two configured candidates to use Reed Muller (RM) coding without Cyclic Redundancy Check (CRC) addition; configuring the UE based on the message; encoding, for transmission to the UE, the first of the maximum of two configured candidates for GC PDCCH; and communicating with the UE based on an identification within the first of the maximum of two configured candidates for GC PDCCH of one or more symbols as DL, UL or flexible.

Example 104 includes the subject matter of Example 92, and optionally, the operations further including encoding, for transmission to the UE, a synchronization signal (SS) block regardless of any overlapping reserved physical resources.

Example 105 includes an apparatus of a New Radio (NR) evolved Node B (gNodeB), the apparatus including: means for determining physical resources confined within a bandwidth part (BWP) of a wireless channel as corresponding to reserved physical resources; encode, for transmission to a User Equipment (UE), a communication including information on configuration parameters of the reserved physical resources, the configuration parameters including time and frequency resources; and process signals received on, or for communication on, only physical resources not overlapping the allocated reserved physical resources.

Example 106 includes the subject matter of Example 105, and optionally, wherein the communication includes at least one of: semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a DCI.

Example 107 includes the subject matter of Example 105, and optionally, wherein the information on configuration parameters includes information, in a time domain, of a periodicity of the reserved physical resources.

Example 108 includes a product comprising one or more computer-readable storage media comprising computer-executable instructions operable to, when executed by at least one computer processor, enable the at least one computer processor to perform the method of any one of Examples 22-40 and 79-91.

Example 109 includes an apparatus comprising means for causing a wireless communication apparatus to perform the method of any one of the above Examples.

Example 110 includes an apparatus comprising means to perform a method as described in any of the preceding Examples.

Example 111 includes a machine-readable storage including machine-readable instructions, which, when executed, are to implement a method or realize an apparatus as described in any preceding Example.

Example 112 includes one or more non-transitory computer-readable media comprising instructions to cause an electronic apparatus, upon execution of the instructions by one or more processors of the electronic apparatus, to perform one or more elements of a method described in or related to any of the preceding Examples, or any other method or process described herein.

Example 113 includes a signal as described in or related to any of the Examples above.

Example 114 includes a signal in a wireless network as shown and described herein.

Example 115 includes a method of communicating in a wireless network as shown and described herein.

Example 116 includes a system for providing wireless communication as shown and described herein.

Example 117 includes an apparatus for providing wireless communication as shown and described herein.

What is claimed is:

1. An apparatus of a New Radio (NR) User Equipment (UE), the apparatus including a radio frequency (RF) interface, and one or more processors coupled to the RF interface and configured to:
   decode a communication from a NR evolved Node B (gNodeB), the communication including information on configuration parameters of reserved physical resources confined within a bandwidth part (BWP) of a wireless channel, the configuration parameters including time and frequency resources;
   based on the communication, determine the reserved physical resources as being allocated reserved physical resources, wherein the allocated reserved physical resources include uplink reserved physical resources, downlink reserved physical resources and flexible reserved physical resources; and
   process signals received on, or for communication on, physical resources not overlapping the allocated reserved physical resources.

2. The apparatus of claim 1, wherein the communication includes at least one of:
   semi-statically configured higher layer signaling including NR minimum system information (MSI), NR remaining minimum system information (RMSI), NR system information block (SIB), or UE-specific radio resource control (RRC) signaling; or
   dynamically configured Layer 1 (L1) signaling including a downlink control information (DCI).

3. The apparatus of claim 1, wherein the information on configuration parameters includes at least one of:
   information, in a time domain, of a periodicity of the reserved physical resources;
   information, in a time domain, on one or more symbol indices within a configured slot, the symbol indices based on a reference numerology corresponding to a numerology of the BWP; or
   information, in a frequency domain, on frequency resource allocation type based on resource block group (RBG), wherein a RBG comprises of one or more consecutive physical resource blocks (PRBs) in a frequency domain.

4. The apparatus of claim 1, wherein the configuration parameters include a first set of configuration parameters, the reserved physical resources include a first set of reserved physical resources, and the allocated reserved physical resources include allocated first reserved physical resources, the one or more processors further to:
   decode information on a second set of configuration parameters of a second set of reserved physical resources, the second configuration parameters including time and frequency resources;
   based on the information on the second set of communication parameters, determine the second set of reserved physical resources as being allocated second reserved physical resources; and
   process signals received on, or for communication on, only physical resources not overlapping the allocated second reserved physical resources.

5. The apparatus of claim 4, wherein:
   the information on the first set of configuration parameters includes a first index corresponding to the first set of reserved physical resources, and the information on the second set of configuration parameters includes a second index corresponding to the second set of reserved physical resources; and the communication is a first communication including semi-statically configured higher layer signaling including NR minimum system information (MSI), NR remaining minimum system information (RMSI), NR system information block (SIB), or UE-specific radio resource control (RRC) signaling, the one or more processors further being configured to:

decode a second communication from the gNodeB including dynamic Layer 1 (L1) signaling comprising downlink control information (DCI), the second communication including information on at least one of the first index or the second index;

based on the information on at least one of the first index or the second index in the second communication, determine at least one of the allocated first reserved physical resources or the allocated second reserved physical resources as corresponding to released reserved physical resources; and process signals received on, or for communication on, physical resources overlapping the released reserved physical resources.

6. The apparatus of claim 4, wherein the one or more processors is to assume a union of the allocated first reserved physical resources and the allocated second reserved physical resources.

7. The apparatus of claim 1, wherein the one or more processors is further to:

decode a Control Resource Set (CORESET) communication from the gNodeB, the CORESET communication corresponding to one or more symbols;

determine from the CORESET communication that the UE is scheduled to monitor for reception a Physical Downlink Control Channel (PDCCH) from the gNodeB on the one or more symbols;

decode a dynamic communication from the gNodeB indicating at least one symbol of the one or more symbols is to be an uplink symbol or a flexible symbol; and refrain from monitoring for reception of the PDCCH on the one or more symbols.

8. The apparatus of claim 1, wherein the allocated reserved physical resources include uplink reserved physical resources, and wherein the one or more processors is further to:

determine from a communication from the gNodeB that the UE is scheduled to receive a Physical Downlink Scheduled Channel (PDSCH) from the gNodeB on multiple slots; and refrain from monitoring for reception of the PDSCH in the slots with the at least some symbols.

9. The apparatus of claim 1, wherein the allocated reserved physical resources include downlink reserved physical resources, and wherein the one or more processors is further to:

determine from a communication from the gNodeB that the UE is scheduled to transmit a Physical Uplink Scheduled Channel (PUSCH) to the gNodeB on multiple slots; and refrain from transmitting the PUSCH in the slots with the at least some symbols.

10. The apparatus of claim 1, wherein the one or more processors is further to:

process a Physical Uplink Control Channel (PUCCH) for transmission of HARQ-ACK feedback to the gNodeB on one or more symbols in response to PDSCH scheduled via DL SPS or dynamic scheduling;

decode a communication from the gNodeB indicating at least one symbol of the one or more symbols is to be a downlink symbol or a flexible symbol; and drop transmission of an entirety of the PUCCH on the one or more symbols.

11. The apparatus of claim 1, wherein the one or more processors is further to:

decode a semi-static communication from the gNodeB indicating, with a switching periodicity, downlink (DL) and uplink (UL) direction assignments for a plurality of symbols; and process signals received from or for transmission to the gNodeB on the symbols indicated as DL or UL direction respectively regardless of any dynamic communication from the gNode B indicating DL direction, UL direction or flexible assignments if the indicated direction conflicts with that indicated via the semi-static communication for one or more of the plurality of symbols.

12. The apparatus of claim 1, further including a front-end module (FEM) coupled to the RF interface.

13. The apparatus of claim 12, further including at least one antenna coupled to the FEM.

14. A product comprising one or more tangible computer-readable non-transitory storage media comprising computer-executable instructions operable to, when executed by at least one computer processor of a User Equipment (UE), cause the at least one computer processor to implement operations comprising:

decoding a communication from a NR evolved Node B (gNodeB), the communication including information on configuration parameters of reserved physical resources confined within a bandwidth part (BWP) of a wireless channel, the configuration parameters including time and frequency resources;

based on the communication, determining the reserved physical resources as being allocated reserved physical resources, wherein the allocated reserved physical resources include uplink reserved physical resources, downlink reserved physical resources and flexible reserved physical resources; and processing signals received on, or for communication on, physical resources not overlapping the allocated reserved physical resources.

15. The product of claim 14, wherein the communication includes at least one of:

semi-statically configured higher layer signaling including NR minimum system information (MSI), NR remaining minimum system information (RMSI), NR system information block (SIB), or UE-specific radio resource control (RRC) signaling; or dynamically configured Layer 1 (L1) signaling including a downlink control information (DCI).

16. The product of claim 14, wherein the information on configuration parameters includes at least one of:

information, in a time domain, of a periodicity of the reserved physical resources;

information, in a time domain, on one or more symbol indices within a configured slot, the symbol indices based on a reference numerology corresponding to a numerology of the BWP; or information, in a frequency domain, on frequency resource allocation type based on resource block group (RBG), wherein a RBG comprises of one or more consecutive physical resource blocks (PRBs) in frequency.

17. The product of claim 14, wherein the configuration parameters include a first set of configuration parameters, the reserved physical resources include a first set of reserved physical resources, and the allocated reserved physical resources include allocated first reserved physical resources, the method further including:
  decoding information on a second set of configuration parameters of a second set of reserved physical resources, the second configuration parameters including time and frequency resources;
    based on information on the second set of communication parameters, determining the second set of reserved physical resources as being an allocated second reserved physical resources; and
  processing signals received on, or for communication on, only physical resources not overlapping the allocated second reserved physical resources.

18. The product of claim 17, wherein:
  the information on the first set of configuration parameters includes a first index corresponding to the first set of reserved physical resources, and the information on the second set of configuration parameters includes a second index corresponding to the second set of reserved physical resources; and
  the communication is a first communication including semi-statically configured higher layer signaling including NR minimum system information (MSI), NR remaining minimum system information (RMSI), NR system information block (SIB), or UE-specific radio resource control (RRC) signaling, the method further including:
  decoding a second communication from the gNodeB including dynamic Layer 1 (L1) signaling comprising downlink control information (DCI), the second communication including information on at least one of the first index or the second index;
  based on the information on at least one of the first index or the second index in the second communication, determining at least one of the allocated first reserved physical resources or the allocated second reserved physical resources as corresponding to released reserved physical resources; and
  processing signals received on, or for communication on, physical resources overlapping the released reserved physical resources.

19. The product of claim 18, further including assuming a union of the allocated first reserved physical resources and the allocated second reserved physical resources.

20. The product of claim 14, further including:
  decoding a Control Resource Set (CORESET) communication from the gNodeB, the CORESET communication corresponding to one or more symbols;
  determining from the CORESET communication that the UE is scheduled to monitor for reception a Physical Downlink Control Channel (PDCCH) from the gNodeB on the one or more symbols;
  decoding a dynamic communication from the gNodeB indicating at least one symbol of the one or more symbols is to be an uplink symbol or a flexible symbol; and
  refraining from a monitoring for reception of the PDCCH on the one or more symbols.

21. The product of claim 14, wherein the allocated reserved physical resources include uplink reserved physical resources, and further including:
  determining from a communication from the gNodeB that the UE is scheduled to receive a Physical Downlink Scheduled Channel (PDSCH) from the gNodeB on multiple slots; and
  refraining from monitoring for reception of the PDSCH in the slots with the at least some symbols.

22. The product of claim 14, wherein the allocated reserved physical resources include downlink reserved physical resources, and further including:
  determining from the communication from the gNodeB that the UE is scheduled to transmit a Physical Uplink Scheduled Channel (PUSCH) to the gNodeB on multiple slots; and
  refraining from transmitting the PUSCH in the slots with the at least some symbols.

23. The product of claim 14, further including:
  processing a Physical Uplink Control Channel (PUCCH) for transmission of HARQ-ACK feedback to the gNodeB on one or more symbols in response to PDSCH scheduled via DL SPS or dynamic scheduling;
  decoding a communication from the gNodeB indicating at least one symbol of the one or more symbols is to be a downlink symbol or a flexible symbol; and
  dropping transmission of an entirety of the PUCCH on the one or more symbols.

24. An apparatus of a New Radio (NR) User Equipment (UE), the apparatus including:
  means for decoding a communication from a NR evolved Node B (gNodeB), the communication including information on configuration parameters of reserved physical resources confined within a bandwidth part (BWP) of a wireless channel, the configuration parameters including time and frequency resources;
  means for determining, based on the communication, the reserved physical resources as being allocated reserved physical resources, wherein the allocated reserved physical resources include uplink reserved physical resources, downlink reserved physical resources and flexible reserved physical resources; and
  means for processing signals received on, or for communication on, physical resources not overlapping the allocated reserved physical resources.

25. The apparatus of claim 24, wherein the communication includes at least one of:
  semi-statically configured higher layer signaling including NR minimum system information (MSI), NR remaining minimum system information (RMSI), NR system information block (SIB), or UE-specific radio resource control (RRC) signaling; or
  dynamically configured Layer 1 (L1) signaling including a downlink control information (DCI).

* * * * *